(12) United States Patent
Feuz et al.

(10) Patent No.: US 11,087,023 B2
(45) Date of Patent: *Aug. 10, 2021

(54) THRESHOLD-BASED ASSEMBLY OF AUTOMATED ASSISTANT RESPONSES

(71) Applicant: GOOGLE LLC, Mountain View, CA (US)

(72) Inventors: Sandro Feuz, Zurich (CH); Sammy El Ghazzal, Zurich (CH)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/891,816

(22) Filed: Jun. 3, 2020

(65) Prior Publication Data

US 2020/0293687 A1    Sep. 17, 2020

Related U.S. Application Data

(63) Continuation of application No. 16/270,045, filed on Feb. 7, 2019, which is a continuation-in-part of (Continued)

(51) Int. Cl.
*G06F 21/62* (2013.01)
*G10L 15/18* (2013.01)
(Continued)

(52) U.S. Cl.
CPC ...... *G06F 21/6245* (2013.01); *G06F 16/3344* (2019.01); *G06F 40/279* (2020.01);
(Continued)

(58) Field of Classification Search
CPC .. G06F 21/6245; G06F 21/32; G06F 16/3344; G06F 40/279; G06F 40/268;
(Continued)

(56) References Cited

U.S. PATENT DOCUMENTS 5,375,244 A    12/1994 McNair
5,493,692 A    2/1996 Theimer et al.
(Continued)

FOREIGN PATENT DOCUMENTS

CN    106683661 A    5/2017
CN    108205627 A    6/2018
(Continued)

OTHER PUBLICATIONS

Chung, Hyunji; Iorga, Michaela; Voas, Jeffrey; Lee, Sangjin; "Alexa, Can I Trust You?", IEEE, Computer, vol. 50, Issue 9, Sep. 22, 2017, pp. 100-104.*

(Continued)

*Primary Examiner* — Victor Lesniewski
(74) *Attorney, Agent, or Firm* — Foley & Lardner LLP

(57) ABSTRACT

Techniques are described herein for assembling/evaluating automated assistant responses for privacy concerns. In various implementations, a free-form natural language input may be received from a first user and may include a request for information pertaining to a second user. Multiple data sources may be identified that are accessible by an automated assistant to retrieve data associated with the second user. The multiple data sources may collectively include sufficient data to formulate a natural language response to the request. Respective privacy scores associated with the multiple data sources may be used to determine an aggregate privacy score associated with responding to the request. The natural language response may then be output at a client device operated by the first user in response to a determination that the aggregate privacy score associated with the natural language response satisfies a privacy criterion established for the second user with respect to the first user.

20 Claims, 8 Drawing Sheets

Related U.S. Application Data application No. 16/079,887, filed as application No. PCT/US2018/045539 on Aug. 7, 2018.

(51) Int. Cl.

| | | |
|---|---|---|
| *G10L 15/22* | (2006.01) | |
| *G10L 15/30* | (2013.01) | |
| *H04L 12/58* | (2006.01) | |
| *H04L 29/08* | (2006.01) | |
| *G06F 16/33* | (2019.01) | |
| *G06F 40/279* | (2020.01) | |
| *H04L 29/06* | (2006.01) | |

(52) U.S. Cl.
CPC .......... *G10L 15/1815* (2013.01); *G10L 15/22* (2013.01); *G10L 15/30* (2013.01); *H04L 51/02* (2013.01); *H04L 63/101* (2013.01); *H04L 63/102* (2013.01); *H04L 67/18* (2013.01); *H04L 67/306* (2013.01)

(58) Field of Classification Search
CPC ................. G06F 40/30; G06F 16/9537; G06F 16/90332; H04L 63/101; H04L 63/102; H04L 51/02; H04L 67/18; H04L 67/306; H04L 51/16; G10L 15/1815; G10L 15/22; G10L 15/30; G10L 15/26
See application file for complete search history.

(56) References Cited

U.S. PATENT DOCUMENTS

| | | | |
|---|---|---|---|
| 5,533,102 | A | 7/1996 | Robinson et al. |
| 5,652,789 | A | 7/1997 | Miner et al. |
| 5,928,325 | A | 7/1999 | Shaughnessy et al. |
| 5,982,863 | A | 11/1999 | Smiley et al. |
| 6,047,053 | A | 4/2000 | Miner et al. |
| 6,175,828 | B1 | 1/2001 | Kuromusha et al. |
| 7,137,126 | B1 | 11/2006 | Coffman et al. |
| 7,308,484 | B1 | 12/2007 | Dodrill et al. |
| 7,359,496 | B2 | 4/2008 | Qian et al. |
| 7,460,652 | B2 | 12/2008 | Chang |
| 7,853,243 | B2 | 12/2010 | Hodge |
| 7,886,334 | B1 | 2/2011 | Walsh et al. |
| 7,945,470 | B1 | 5/2011 | Cohen et al. |
| 8,166,119 | B2 | 4/2012 | Ligh et al. |
| 8,479,302 | B1 | 7/2013 | Lin |
| 8,559,926 | B1 | 10/2013 | Zang et al. |
| 8,576,750 | B1 | 11/2013 | Hecht et al. |
| 8,656,465 | B1 | 2/2014 | Fong-Jones et al. |
| 8,732,246 | B2 | 5/2014 | Jayanthi |
| 8,769,676 | B1 | 7/2014 | Kashyap |
| 8,838,641 | B2 | 9/2014 | Saito et al. |
| 8,892,446 | B2 | 11/2014 | Cheyer et al. |
| 8,914,632 | B1 | 12/2014 | Shankar et al. |
| 8,971,924 | B2 | 3/2015 | Pai et al. |
| 8,990,329 | B1 | 3/2015 | Khvostichenko et al. |
| 9,058,470 | B1 | 6/2015 | Nissan et al. |
| 9,147,054 | B1 | 9/2015 | Beal et al. |
| 9,190,075 | B1 | 11/2015 | Cronin |
| 9,509,799 | B1 | 11/2016 | Cronin |
| 9,531,607 | B1 | 12/2016 | Pai et al. |
| 9,712,571 | B1 | 7/2017 | Bertz et al. |
| 9,807,094 | B1 | 10/2017 | Liu et al. |
| 10,032,039 | B1* | 7/2018 | Milman ............... G06F 21/6218 |
| 10,091,230 | B1* | 10/2018 | Machani ............... G06F 21/316 |
| 10,257,241 | B2 | 4/2019 | Griffin |
| 10,404,757 | B1* | 9/2019 | Horton .................... H04L 63/20 |
| 10,523,814 | B1 | 12/2019 | Moore et al. |
| 10,783,327 | B2* | 9/2020 | Gordon ............... G06N 3/0454 |
| 2001/0039581 | A1 | 11/2001 | Deng et al. |
| 2002/0016729 | A1 | 2/2002 | Breitenbach et al. |
| 2002/0048356 | A1 | 4/2002 | Takagi et al. |
| 2002/0131565 | A1 | 9/2002 | Scheuring et al. |
| 2002/0136370 | A1 | 9/2002 | Gallant |
| 2003/0028593 | A1 | 2/2003 | Ye et al. |
| 2003/0073412 | A1 | 4/2003 | Meade, II |
| 2004/0117371 | A1 | 6/2004 | Bhide et al. |
| 2004/0139030 | A1 | 7/2004 | Stoll |
| 2004/0187109 | A1 | 9/2004 | Ross et al. |
| 2004/0187152 | A1 | 9/2004 | Francis et al. |
| 2005/0065995 | A1 | 3/2005 | Milstein et al. |
| 2005/0138118 | A1 | 6/2005 | Banatwala et al. |
| 2006/0210033 | A1 | 9/2006 | Grech et al. |
| 2006/0253456 | A1 | 11/2006 | Pacholec et al. |
| 2007/0027921 | A1* | 2/2007 | Alvarado ............. G06Q 10/109 |
| 2007/0104361 | A1 | 5/2007 | Alexander |
| 2007/0150426 | A1 | 6/2007 | Asher et al. |
| 2007/0266427 | A1 | 11/2007 | Kevenaar et al. |
| 2007/0282598 | A1 | 12/2007 | Waelti et al. |
| 2007/0297430 | A1 | 12/2007 | Nykanen et al. |
| 2008/0046369 | A1 | 2/2008 | Wood |
| 2008/0177860 | A1 | 7/2008 | Khedouri et al. |
| 2008/0183811 | A1 | 7/2008 | Kotras et al. |
| 2009/0117887 | A1 | 5/2009 | Narayanaswamy et al. |
| 2009/0198678 | A1 | 8/2009 | Conrad et al. |
| 2009/0210148 | A1 | 8/2009 | Jayanthi |
| 2009/0210799 | A1 | 8/2009 | Reiser et al. |
| 2009/0216859 | A1 | 8/2009 | Dolling |
| 2009/0233629 | A1 | 9/2009 | Jayanthi |
| 2010/0005518 | A1 | 1/2010 | Tirpak et al. |
| 2010/0106499 | A1 | 4/2010 | Lubowich et al. |
| 2010/0114571 | A1 | 5/2010 | Nagatomo |
| 2010/0180218 | A1 | 7/2010 | Boston et al. |
| 2010/0228777 | A1 | 9/2010 | Imig et al. |
| 2011/0040768 | A1 | 2/2011 | Shon et al. |
| 2011/0083163 | A1 | 4/2011 | Auvenshine et al. |
| 2011/0090899 | A1 | 4/2011 | Fedorov |
| 2011/0144980 | A1 | 6/2011 | Rysenga |
| 2011/0225631 | A1 | 9/2011 | Pearson et al. |
| 2011/0237227 | A1 | 9/2011 | Kemery et al. |
| 2011/0239276 | A1 | 9/2011 | Garcia et al. |
| 2011/0276896 | A1 | 11/2011 | Zambetti et al. |
| 2012/0005030 | A1 | 1/2012 | Valin et al. |
| 2012/0027256 | A1 | 2/2012 | Kiyohara et al. |
| 2012/0130771 | A1 | 5/2012 | Kannan et al. |
| 2012/0221952 | A1 | 8/2012 | Chavez |
| 2012/0222132 | A1 | 8/2012 | Burger et al. |
| 2012/0254966 | A1 | 10/2012 | Parker |
| 2012/0275450 | A1 | 11/2012 | Connelly et al. |
| 2012/0309510 | A1 | 12/2012 | Taylor et al. |
| 2013/0006636 | A1 | 1/2013 | Mizuguchi et al. |
| 2013/0036455 | A1 | 2/2013 | Bodi et al. |
| 2013/0111487 | A1 | 5/2013 | Cheyer et al. |
| 2013/0129161 | A1 | 5/2013 | Goel |
| 2013/0198811 | A1 | 8/2013 | Yu et al. |
| 2013/0262966 | A1 | 10/2013 | Wu et al. |
| 2013/0325759 | A1 | 12/2013 | Rachevsky et al. |
| 2014/0033274 | A1 | 1/2014 | Okuyama |
| 2014/0043426 | A1 | 2/2014 | Bicanic et al. |
| 2014/0074545 | A1 | 3/2014 | Minder et al. |
| 2014/0081633 | A1 | 3/2014 | Badaskar |
| 2014/0171133 | A1* | 6/2014 | Stuttle .................. G06F 16/9537 455/466 |
| 2014/0172953 | A1 | 6/2014 | Blanksteen |
| 2014/0180641 | A1 | 6/2014 | Lee et al. |
| 2014/0195621 | A1 | 7/2014 | Rao Dv |
| 2014/0207953 | A1 | 7/2014 | Beck et al. |
| 2014/0267565 | A1 | 9/2014 | Nakafuji et al. |
| 2014/0280223 | A1 | 9/2014 | Ram et al. |
| 2014/0328570 | A1 | 11/2014 | Cheng et al. |
| 2014/0359717 | A1 | 12/2014 | Robertson et al. |
| 2015/0047002 | A1 | 2/2015 | Tamura |
| 2015/0051948 | A1 | 2/2015 | Aizono et al. |
| 2015/0056951 | A1 | 2/2015 | Talwar et al. |
| 2015/0086001 | A1 | 3/2015 | Farrand et al. |
| 2015/0101022 | A1* | 4/2015 | Zent ........................ G06F 21/30 726/4 |
| 2015/0179000 | A1 | 6/2015 | Jayanthi et al. |
| 2015/0185996 | A1 | 7/2015 | Brown et al. |
| 2015/0199523 | A1* | 7/2015 | Hamilton ............ G06F 21/6245 726/27 |
| 2015/0199567 | A1 | 7/2015 | Fume et al. |
| 2015/0207799 | A1 | 7/2015 | Steiner et al. |

(56) References Cited

U.S. PATENT DOCUMENTS

| | | |
|---|---|---|
| 2015/0215350 A1 | 7/2015 | Slayton et al. |
| 2015/0304361 A1 | 10/2015 | Tamura |
| 2015/0324454 A1 | 11/2015 | Roberts et al. |
| 2015/0324606 A1* | 11/2015 | Grondin ............... G06F 3/0482 726/1 |
| 2015/0332063 A1 | 11/2015 | Masuda |
| 2015/0348551 A1 | 12/2015 | Gruber et al. |
| 2015/0364141 A1 | 12/2015 | Lee et al. |
| 2015/0365807 A1 | 12/2015 | Gianakis |
| 2015/0379887 A1 | 12/2015 | Becker et al. |
| 2016/0019471 A1 | 1/2016 | Shin et al. |
| 2016/0050217 A1 | 2/2016 | Mare et al. |
| 2016/0063277 A1 | 3/2016 | Vu et al. |
| 2016/0100019 A1 | 4/2016 | Leondires |
| 2016/0125048 A1 | 5/2016 | Hamada |
| 2016/0155442 A1 | 6/2016 | Kannan et al. |
| 2016/0170970 A1 | 6/2016 | Lindblom et al. |
| 2016/0203002 A1 | 7/2016 | Kannan et al. |
| 2016/0212138 A1 | 7/2016 | Lehane |
| 2016/0261425 A1 | 9/2016 | Horton et al. |
| 2016/0352778 A1 | 12/2016 | Chari et al. |
| 2017/0013122 A1 | 1/2017 | Cohen et al. |
| 2017/0054661 A1 | 2/2017 | Golcher Barguil et al. |
| 2017/0091658 A1 | 3/2017 | Matthiesen et al. |
| 2017/0091778 A1 | 3/2017 | Johnson et al. |
| 2017/0098192 A1 | 4/2017 | Follis |
| 2017/0132199 A1 | 5/2017 | Vescovi et al. |
| 2017/0201491 A1 | 7/2017 | Schmidt et al. |
| 2017/0228376 A1 | 8/2017 | Noma |
| 2017/0228550 A1 | 8/2017 | Harb |
| 2017/0262783 A1 | 9/2017 | Franceschini et al. |
| 2017/0289168 A1* | 10/2017 | Bar ....................... G06F 21/316 |
| 2017/0293851 A1* | 10/2017 | Chawla .................. G06N 5/048 |
| 2017/0318075 A1 | 11/2017 | Liensberger et al. |
| 2017/0337184 A1 | 11/2017 | Quah et al. |
| 2017/0337287 A1* | 11/2017 | Gill ..................... G06F 16/9537 |
| 2017/0372095 A1 | 12/2017 | Ferrara et al. |
| 2017/0372429 A1* | 12/2017 | La Placa ................ G06N 5/02 |
| 2018/0018384 A1 | 1/2018 | Nomura et al. |
| 2018/0046986 A1 | 2/2018 | Wang et al. |
| 2018/0054852 A1 | 2/2018 | Mohan et al. |
| 2018/0060599 A1 | 3/2018 | Horling et al. |
| 2018/0088777 A1 | 3/2018 | Daze et al. |
| 2018/0109649 A1* | 4/2018 | Bhupati .................. H04L 51/36 |
| 2018/0121665 A1 | 5/2018 | Anderson et al. |
| 2018/0129960 A1 | 5/2018 | Caballero et al. |
| 2018/0248888 A1 | 8/2018 | Takahashi et al. |
| 2018/0288063 A1* | 10/2018 | Koottayi ............... H04L 63/102 |
| 2018/0358005 A1 | 12/2018 | Tomar et al. |
| 2019/0042564 A1 | 2/2019 | Badr et al. |
| 2019/0065975 A1* | 2/2019 | White ....................... G06F 7/08 |
| 2019/0108353 A1 | 4/2019 | Sadeh et al. |
| 2019/0138996 A1* | 5/2019 | Salvi ....................... G06F 40/35 |
| 2019/0149549 A1* | 5/2019 | Sun ....................... H04L 63/102 726/4 |
| 2019/0196779 A1* | 6/2019 | Declerck ................ G10L 15/22 |
| 2019/0205301 A1 | 7/2019 | Ni |
| 2019/0207946 A1* | 7/2019 | Mertens .............. G06F 21/6218 |
| 2020/0029167 A1* | 1/2020 | Bostick ................ H04R 1/1083 |
| 2020/0065513 A1* | 2/2020 | Sridharan ............. G06F 21/629 |
| 2020/0081736 A1* | 3/2020 | Gopalan ................ G06F 9/542 |
| 2020/0134211 A1* | 4/2020 | Miller ................... H04W 12/02 |

FOREIGN PATENT DOCUMENTS

| | | |
|---|---|---|
| DE | 10 2017 122 358 A1 | 6/2018 |
| EP | 1 672 896 A1 | 6/2006 |
| EP | 2 528 360 A1 | 11/2012 |
| JP | 2014-514623 A | 6/2014 |
| JP | 2015-518201 A1 | 6/2016 |
| WO | WO-2015/049948 | 4/2015 |
| WO | WO-2017/076211 | 5/2017 |
| WO | WO-2018/118164 A1 | 6/2018 |

OTHER PUBLICATIONS

Orwant, Jon, "Doppelganger Goes to School: Machine Learning for User Modeling", Submitted to the Program in Media Arts and Sciences in Partial Fulfillment of the Requirements for the Degree of Master of Science in Media Arts and Sciences at the Massachusetts Institute of Technology, Sep. 1993 (89 pages).

Castagnos et al., "Toward a Robust Diversity-Based Model to Detect Changes of Context", 2015 IEEE 27th International Conference on Tools with Artificial Intelligence (ICTAI), IEEE, 2015, pp. 534-541 (8 pages).

Hong et al., "Setting Access Permission through Transitive Relationship in Web-based Social Networks", SWKM'2008: Workshop on Social Web and Knowledge Management @ WWW 2008, Apr. 22, 2008 (8 pages).

International Search Report and Written Opinion for PCT Appln. Ser. No. PCT/US2018/045539 dated Apr. 25, 2019 (11 pages).

Oberheide et al., "When Mobile is Harder Than Fixed (and Vice Versa): Demystifying Security Challenges in Mobile Environments", In Proceedings of the Eleventh Workshop on Mobile Computing Systems & Applications, ACM, Feb. 2010, pp. 43-48 (6 pages).

* cited by examiner

THRESHOLD-BASED ASSEMBLY OF AUTOMATED ASSISTANT RESPONSES

CROSS-REFERENCE TO RELATED APPLICATIONS

This application claims the benefit of priority under 35 U.S.C. § 120 as a continuation of U.S. patent application Ser. No. 16/270,045, filed Feb. 7, 2019, which claims the benefit of priority under 35 U.S.C. § 120 as a continuation-in-part of U.S. patent application Ser. No. 16/079,887, filed Aug. 24, 2018, which claims the benefit of priority, and is a national stage entry under 35 U.S.C. § 371, of International Patent Application No. PCT/US2018/045539, filed Aug. 7, 2018, each of which are hereby incorporated by reference herein in their entirety.

BACKGROUND

Computing devices may have access to one or more types of input and output interfaces. The computing device can receive or transmit data to one or more types of devices via a network. However, due to the different types of input and output interfaces, and different types of devices, it can be challenging to efficiently present data via the computing device.

SUMMARY

As automated assistants become more ubiquitous, computing devices specifically designed to facilitate interaction with automated assistants—referred to herein as "assistant devices"—are becoming more commonplace. Many assistant devices enable users to engage in touch-free interaction with automated assistants. For example, assistant devices often include microphones that allow users to provide vocal utterances as input. Additionally, more and more assistant devices now include display capabilities.

Techniques are described herein for responding to requests for automated assistants to act in accordance with information associated with a given user (e.g., a homeowner, or more generally, a user who controls/owns device(s) that provide automated assistant access, also referred to herein as a "subject user") when the request originates with other users (e.g., guests of the homeowner, or "guest" users operating particular device, also referred to herein as a "requesting user"). In various implementations, a request submitted by a first user that relates to information associated with a second user may be relatively broad and/or open-ended. Satisfying such a request may require access to multiple data sources that store data associated with the second user. Techniques described herein are usable to aggregate individual privacy scores associated with these data sources and/or data obtained from these data sources, and to determine whether (or how specifically) to respond to the request based on the aggregate privacy score.

In some implementations, the automated assistant may formulate a natural language response based on the multiple data from the multiple data sources, and this natural language response may be associated with the aggregate privacy score. Alternatively, the automated assistant may perform an action (such as controlling one or more devices). A determination may be made of whether the aggregate data score satisfies some criterion, such as not exceeding a privacy threshold. If the criterion is satisfied (e.g., the aggregate privacy score does not exceed the privacy threshold), the formulated natural language response may be output by the automated assistant to the requesting user and/or an action requested by the requesting user may be performed.

As an example, suppose Dave submits the following request to an automated assistant: "When is Alice free for dinner?" Alice may not necessarily maintain a comprehensive calendar, particularly for social activities occurring outside of business hours. Accordingly, in order to answer this question the automated assistant may need to access data source(s) beyond Alice's calendar, such as Alice's emails or texts (which may contain communications about upcoming dinner plans), or Alice's current location (which could rule out dinner in the immediate future if Alice is far away).

Suppose Alice previously provided Dave with at least some access to her calendar (or at least signaled that Dave is entitled to an elevated level of trust, generally). That means any data obtained on behalf of Dave from Alice's calendar may be assigned a relatively low privacy score. However, Alice may consider her electronic correspondence and/or current location to be far more private/sensitive. Consequently, data obtained from those sources may have relatively high privacy scores. Suppose the automated assistant is able to determine, using data from all three sources, that Alice is next available for dinner a week from Tuesday. The automated assistant may formulate a natural language response such as "Alice is available for dinner a week from Tuesday." However, the automated assistant may not yet provide this response to Dave. Instead, the automated assistant may determine and/or evaluate an aggregate privacy score determined from the three underlying data sources, and determine that Alice's privacy criterion with respect to Dave (or at least with respect to this particular request) does not permit the automated assistant to provide this response. Accordingly, the automated assistant may instead tell Dave, "Sorry, I can't provide that information." In some implementations, the automated assistant (or, technically, another instance of an automated assistant) may meanwhile seek permission from Alice to provide Dave with an answer to his request.

In another example, Dave is visiting Alice at her home. Dave may request an automated assistant to "Turn up the heating". A data source relevant to this request may provide the current temperature to which a heating system linked to the automated assistant is set. Alice may be willing to share this data with Dave. However, Alice may additionally control her heating in dependence on both a set schedule and her current location. Since, as above, Alice may consider location information to be sensitive, the aggregate privacy score for the data sources necessary to perform the request may be such that Dave does not meet the privacy criterion. If so, the automated assistant may reply "Sorry, I can't help with that" or similar. If Dave does meet the privacy criterion, the automated assistant may enact the relevant action (for example, by instructing the heating system to respond accordingly).

In some implementations, the automated assistant may go ahead and assemble sufficient data to formulate an answer (referred to as "fulfillment information" below), and then present that answer to Alice as part of soliciting permission from Alice to present it to Dave. In some such implementations, Alice could even be presented with audible or visual output that identifies the data sources used to generate the answer, which data points from each data source were used to assemble the answer. That way Alice can see exactly how the answer was assembled and decide whether to permit the answer to be presented to Dave.

In some implementations, subject users' responses to such requests may be used to determine whether future requests should be fulfilled or denied. For example, in some implementations, various aspects of the answer, the data sources used, attributes of Dave, attributes of a relationship between Dave and Alice, etc., may be used to generate a feature vector that is then labeled as a positive or negative training example (depending on whether Alice permitted or denied the request) and used to train a machine learning model. Alternatively, if Alice denies permission, that may be used as a negative training example (i.e., deny access). In either case, the machine learning model (e.g., neural network, support vector machine, etc.) may be trained to generate output that indicates whether or not a requesting user should be provided with information responsive to their request. For future requests, unlabeled feature vectors may be generated based on attributes of the request (e.g., number of words, semantic/syntactic attributes, breadth, etc.), the requesting user, the subject user, a relationship between the requesting and subject user, etc., and applied as input across the trained machine learning model to generate output that indicates whether or not the request should be fulfilled.

In various implementations, different data sources may have different privacy scores. For example, data sources that are available online, e.g., on one or more servers forming what is often referred to as a "cloud" computing system, may have lower privacy scores than, say, data sources that are only available locally on one or more client devices operated by a user. As another example, users may explicitly assign privacy scores to different data sources. For example, a user may elect to make her calendar less private than, say, electronic correspondence. In some implementations, some data sources may arbitrarily or by default be assigned different privacy scores, e.g., based on general notions of privacy and/or sensitivity. For example, most users would likely agree that their personal electronic correspondence (e.g., emails, text messages) are more private than, say, data sources that are at least partially available to others, such as social network profiles. As another example, a user's browsing and/or search history would be considered by most users to be more private than say, a user's song playlist or restaurants that the user has recommended to others.

Additionally or alternatively, in some implementations, data itself, rather than the source it is drawn from, may be used to determine its privacy score. Suppose fulfilling a first user's request requires a second user's credit card information. For example, a son could say something like, "Hey assistant, can you order me a supreme pizza to be delivered from <store_x>. We can use mom's VISA." Such highly-sensitive information may be assigned a relatively high privacy score, regardless of where it is drawn from. In this example, if the aggregate privacy score does not satisfy a privacy criterion, then the son's request may be denied.

Various criteria may be used by an automated assistant to determine whether to provide a requesting user with information about another user using techniques described herein. As noted above, in some implementations, it may suffice for the aggregate privacy score to fall short of some privacy threshold. In various implementations, such a privacy threshold may be determined in various ways. In some implementations, the privacy threshold may be determined based on a measure of specificity or granularity associated with a user's request, e.g., as a sliding scale. In other words, the breadth of the user's request may be used to determine how strictly it should be scrutinized for privacy concerns. This may reduce the likelihood of the requestor being able to infer specific pieces of information about the other user from general answers.

For example, a request that seeks highly specific information (e.g., "Where will Axel be at 11 PM tomorrow night?") may be subject to relatively strict scrutiny. The privacy threshold may be set relatively low, and therefore, may be more easily matched and/or exceeded (in which case the request would be denied). By contrast, a request seeking coarser, less specific information (e.g., "Is Cynthia available for Dinner tomorrow or Wednesday?") may be subject to less strict scrutiny. For example, the privacy threshold may be set relatively high, and therefore, may be more difficult to violate.

A requests' breadth may be determined based on signals other than time slots or locations associated with users. For example, a general or broad request such as "Does George like historical fiction?" may be subjected to less scrutiny (e.g., an aggregate privacy score associated with the response may be compared to a relatively high privacy threshold) than, say, a highly specific request such as "Does George already own an electronic copy of 'Gone with the Wind'?" As another example, a request such as "Does Antoine like seafood?" may be subjected to less scrutiny than, say, a highly-specific request such as "When has Antoine most recently eaten at <seafood restaurant>?"

Users often customize various aspects of their automated assistant experiences, e.g., by selecting different voice synthesizers. Techniques described herein may leverage these customizations in order to strengthen the appearance of speaking with another user's automated assistant. For instance, Dave may set his automated assistant client to a male voice, and Alice may set her automated assistant client to a female voice. Consequently, when Dave invokes an instance of an automated assistant (and assuming his identity is ascertained), he hears a male voice. Likewise, when Alice invokes an instance of an automated assistant, she hears a female voice. In various implementations, techniques described herein may be employed such that when Dave invokes seeks to communicate with Alice's automated assistant, the female voice synthesizer employed by Alice may be activated for the automated instance invoked by Dave. Consequently, even though Dave may still be interacting with his own automated assistant client executing on his own computing device, he nevertheless hears the voice of Alice's assistant, effectively providing Dave with the experience of speaking with Alice's assistant.

In some implementations, relatively innocuous information divulged to a requesting user about a particular user (sometimes referred to herein as a "subject user") may be selectively obscured from the particular user. The subject user may be required to provide some sort of input first before being informed about the requesting user's request and/or the information divulged. This may be beneficial, for instance, for users to be able to buy presents for other users. Suppose a user named Jack asks an automated assistant "Does Mary like peonies?" It would be unfortunate if Mary were immediately informed that Jack had asked this question because she would not be surprised when Jack presented her with peonies. Accordingly, with techniques described herein, Mary may only be pushed output (e.g., a card on her home screen) informing her that someone asked about her tastes, may have purchased her a present, etc. The output might not specify the request or the responsive information unless Mary takes some affirmative action, such as clicking on the output.

In some implementations, this feature may only be available for users who are deemed highly trustworthy. For example, if a husband asks his wife's assistant for restaurant recommendations for their anniversary, the wife's automated assistant (or in some cases, an instance of an automated assistant presented as serving the wife) may search one or more data sources (e.g., receipt history of the wife, past electronic correspondence of the wife, calendar entries of the wife, etc.) and formulate an answer as described herein. A privacy threshold for this request may be determined to be relatively high, because the wife likely has a high level of trust for the husband. Consequently, even if the formulated answer is drawn from multiple, high-sensitivity data sources associated with the wife, the privacy threshold may not be met, and the husband might be provided with one or more restaurant recommendations. Meanwhile, the wife may only be presented with vague output indicative of the husband's request. The output may not identify the husband or the nature of the request, with the goal of allowing the wife to preserve the surprise. By contrast, had a different user, such as the wife's co-worker, requested similar information (restaurant recommendations for the wife), they may or may not have been provided with responsive information, and the wife may have been pushed more detailed information about the request.

Techniques described herein give rise to a variety of technical advantages. Formulating responses to relatively open-ended and/or broad requests enables automated assistants to "hide" individual data points in relatively broad answers, preserving a user's privacy in specific data points. For instance, in the example above, Alice's electronic correspondence may reveal relatively specific data points, such that she has dinner Sunday night at Restaurant A at 7:30 PM and dinner Monday night at Restaurant B at 7:00 PM. However, the ultimate formulated response of "Alice is available for Dinner on Tuesday" provides a satisfactory answer to Dave without divulging more information about Alice's personal life than necessary. As another example, users are able to determine information about other users without actually establishing communications (e.g., telephone calls, electronic correspondence) with the other users, or without having to repeatedly attempt to establish communications with the other users. This may conserve network resources and/or time that might otherwise be spent by users repeatedly trying to connect with one another.

In some implementations, a method performed by one or more processors is provided that includes: receiving a free-form natural language text segment from a first user via a client device operated by the first user, wherein the free-form natural language text segment comprises a request pertaining to a second user; identifying at least first and second data sources that are accessible by an automated assistant to retrieve data associated with the second user, wherein the first and second data sources include sufficient data to respond to the request; determining a first privacy score associated with the first data source and a second privacy score associated with the second data source; determining an aggregate privacy score associated with responding to the request based on the first privacy score and the second privacy score; and causing the client device operated by the first user to respond to the request in response to a determination that the aggregate privacy score associated responding to the request satisfies a privacy criterion established for the second user with respect to the first user.

These and other implementations of technology disclosed herein may optionally include one or more of the following features.

The request may be a request for information and causing the client device to respond to the request for information may comprise causing the client device to output a natural language response to the request for information. Alternatively, the request may be a request to control one or more devices, and causing the device to respond to the request may comprise transmitting instructions to the one or more devices.

In various implementations, the method may further include obtaining a first data point from the first data source and a second data point from the second data source; and formulating the natural language response based on the first data point and the second data point. In various implementations, the first data source may include a calendar database or a location service. In various implementations, the first data source may include a corpus of communications sent or received by the second user. In various implementations, the corpus of communications may be stored locally on a second client device operated by the second user.

In various implementations, determining the first privacy score associated with the first data source may include determining that the first data source is local to a second client computing device operated by the second user. In various implementations, determining the second privacy score associated with the second data source may include determining that the second data source is available on one or more servers that are remote from any client computing device operated by the second user. In various implementations, the first privacy score may have greater influence on the aggregate privacy score than the second privacy score.

In various implementations, the determination that the aggregate privacy score associated with the natural language response satisfies a privacy criterion established for the second user with respect to the first user may include applying data indicative of the first and second data sources as input across a trained machine learning model to generate output, wherein the output is used to determine whether the privacy criterion is satisfied.

In various implementations, the privacy criterion may include a privacy threshold. In various implementations, the privacy threshold may be selected based on a breadth of the request for information pertaining to the second user.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

At least one aspect is directed to a system to assemble responses from automated assistants. The system can include one or more server computing devices that implement a server portion of one or more automated assistants. The system can include, implement or execute a first automated assistant and a second automated assistant. The first automated assistant can receive a text segment via a client device associated with a first electronic account. The text segment includes a request for information from a second electronic account associated with a plurality of data sources. The first assistant can identify a second automated assistant corresponding to the second electronic account. The first assistant can transmit, to the second automated assistant, the request for the information. The second automated assistant can receive the request from the first automated assistant. The second automated assistant can identify, from the plurality of data sources associated with the second electronic account, a first data source and a second data source based on the request for the information. The second automated assistant can determine a first privacy score associated with the first data source and a second privacy score associated with the second data source. The second automated assistant can determine, based on the first privacy score and the second privacy score, an aggregate privacy score associated with generation of a response to the request from the first automated assistant. The second automated assistant can provide, to the first automated assistant responsive to the aggregate privacy score satisfying a threshold, data from the first data source and the second data source. The first automated assistant can generate, based on data from the first data source and the second data source, a natural language response to be output at the client device in response to the determination that the aggregate privacy score satisfies the threshold.

The one or more server computing devices can receive audio captured by the client device. The one or more server computing devices can convert the audio to the text segment. The one or more server computing devices can provide the natural language response to the client device to cause the client device to present an audio output comprising the natural language response.

The one or more server computing devices can select, based on the request, the first data source comprising one of a calendar database, a location service, or a corpus of communications associated with the second electronic account. The one or more server computing devices can select, based on the request, the first data source comprising a calendar database. The one or more server computing devices can select, based on the request, the second data source comprising a location service.

The one or more server computing devices can include a digital component selector. The digital component selector can provide, for presentation via the client device along with the natural language response, a digital component selected via a real-time digital component selection process. The digital component selector can determine, based on a policy, to initiate a real-time digital component selection process based on the aggregate privacy score. The digital component selector can determine, based on a policy, to block initiation of a real-time digital component selection process based on the aggregate privacy score. The digital component selector can determine, based on the natural language response generated for output at the client device, to initiate a real-time digital component selection process.

The digital component selector can identify a computing resource reduction policy. The digital component selector can determine, via the computing resource reduction policy, to block execution of a real-time digital component selection process based on the aggregate privacy score corresponding to the request. The digital component selector can detect an indication of a change in the aggregate privacy score for a subsequent request. The digital component selector can determine, via the computing resource reduction policy, to initiate execution of the real-time digital component selection process based on the change in the aggregate privacy score for the subsequent request. The digital component selector can provide, to the client device, a digital component selected via the real-time digital component selection process.

At least one aspect is directed to a method of assembling responses from automated assistants. The method can include a first automated assistant executed by one or more server computing devices receiving a text segment via a client device associated with a first electronic account. The text segment includes a request for information from a second electronic account associated with a plurality of data sources. The method can include the first automated assistant identifying a second automated assistant executed by the one or more server computing devices corresponding to the second electronic account. The method can include the first automated assistant transmitting the request for the information to the second automated assistant. The method can include the second automated assistant receiving the request from the first automated assistant. The method can include the second automated assistant identifying from the plurality of data sources associated with the second electronic account, a first data source and a second data source based on the request for the information. The method can include the second automated assistant determining a first privacy score associated with the first data source and a second privacy score associated with the second data source. The method can include the second automated assistant determining, based on the first privacy score and the second privacy score, an aggregate privacy score associated with generation of a response to the request from the first automated assistant. The method can include the second automated assistant providing, to the first automated assistant responsive to the aggregate privacy score satisfying a threshold, data from the first data source and the second data source. The method can include the first automated assistant generating, based on data from the first data source and the second data source, a natural language response to be output at the client device in response to the determination that the aggregate privacy score satisfies the threshold.

DETAILED DESCRIPTION

Humans may engage in human-to-computer dialogs with interactive software applications referred to herein as "automated assistants" (also referred to as "chatbots," "virtual assistants," "interactive personal assistants," "intelligent personal assistants," "personal voice assistants," "conversational agents," etc.). For example, humans (which when they interact with automated assistants may be referred to as "users") may provide commands, queries, and/or requests using free form natural language input which may include vocal utterances converted into text and then processed and/or typed free form natural language input.

There are a variety of situations in which it may be desirable for one person to communicate with an automated assistant serving another user, or least to provide the appearance of communicating with an automated assistant serving another user. Suppose a first user wishes to engage with actions available through an automated assistant serving another user. For example, the first user may wish to control one or more smart devices under the control of another user's automated assistant. Such actions may require information from multiple data sources to ensure compliance with settings established by the second user. In another example, the first user may wish to schedule a dinner with a second user across a multi-day time interval. In order to determine the second user's availability, the first user might call, email, or text the second user. However, the second user may not be available to answer the first user's question, or might prefer not to be interrupted. In such a situation an automated assistant could step in and provide information to the first user about the second user's availability. However, in order to respond to the first user's request—particularly such an open-ended and non-specific request—the automated assistant may need access to multiple data sources storing data associated with the second user. Moreover, at least some of the data sources may store data that the second user may consider private or highly sensitive. For example, most users typically would consider data such as personal online calendars, emails, text messages, etc., to be relatively private and/or sensitive. Additionally, some data necessary to respond to the first user's request may only be available locally on a client device operated by the second user.

Figure 1:
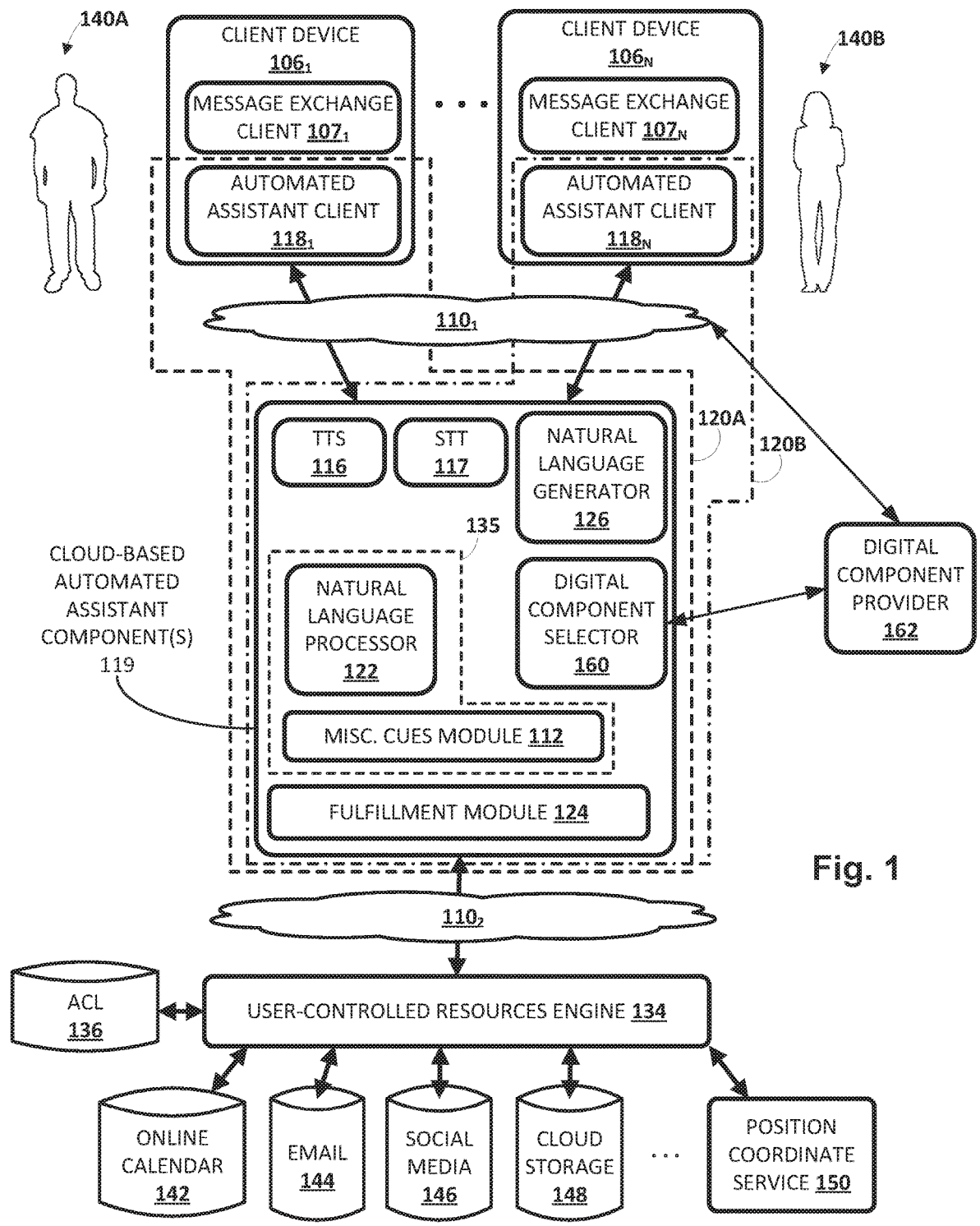
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119 may be implemented on one or more computing systems (collectively referred to as a "cloud" computing system) that are communicatively coupled to client devices $106_{1-N}$ via one or more local and/or wide area networks (e.g., the Internet) indicated generally at 1101.

In various implementations, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user 140A operating first client device $106_1$ and includes automated assistant client 1181 and one or more cloud-based automated assistant components 119. A second automated assistant 120B encompassed by a dash-dash-dot line serves a second user 140B operating another client device 106N and includes automated assistant client 118N and one or more cloud-based automated assistant components 119. It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which may or may not be equipped with input/output devices such as microphones, cameras, speakers), and/or a wearable apparatus of the user that includes a computing device (e.g., a watch of the user having a computing device, glasses of the user having a computing device, a virtual or augmented reality computing device). Additional and/or alternative client computing devices may be provided.

In some implementations, a given user may communicate with automated assistant 120 utilizing a plurality of client computing devices 106 that collectively from a coordinated "ecosystem" of computing devices. In some such implementations, automated assistant 120 may be considered to "serve" that given user, e.g., endowing automated assistant 120 with enhanced access to user-controlled content (e.g., resources, documents, etc.) for which access is controlled by the "served" user.

A first automated assistant 120A can receive a text segment via a client device $106_1$ (or automated assistant client 1181 of the client device $106_1$). The text segment can include a request for information from a second electronic account associated with or managed by or accessed by a second automated assistant 120B. The second account can be associated with user-controlled resources, which can be referred to as or include a plurality of data sources. The user-controlled resources can be managed by a user-controlled resources engine 134. The plurality of data sources can include a calendar database (e.g., online calendar 142), location service (e.g., position coordinate service 150), or a corpus of communication associated with the second electronic account (e.g., one or more of email 144, social media 146, or cloud storage 148).

For example, in FIG. 1, a user-controlled resources engine 134 may be implemented on one or computing devices (which again may be collectively referred to as a "cloud") to control access to resources such as data controlled by each user. In some implementations, user-controlled resources engine 134 may be operably coupled with one or more computing systems that implement automated assistant 120 via one or more local and/or wide area networks (e.g., the Internet) indicated generally at 1102. Additionally or alternatively, user-controlled resources engine 134 may be implemented in whole or in part on the same computing systems that implement automated assistant 120.

In some implementations, user-controlled resources engine 134 may include one or more access control lists ("ACL" in FIG. 1) 136 that govern access to various sources of user user-controlled data. In some implementations, access control list 136 may indicate access rights regarding one or more data sources that store data controlled by individual users. Access control lists 136 may take various forms, such as database entries or a list of access control entries, that include indications, for each user, of what content controlled by that user is accessible to others (including the others' automated assistants), how it is accessible (e.g., read, write, etc.), and so forth.

In some implementations, access control lists 136 may include, for each user, a list of privacy thresholds associated with other users. These privacy thresholds may be user-specific, or may be associated with groups of users, classes of users, etc. In some implementations, these privacy thresholds may be compared to aggregate privacy scores associated with responses assembled by automated assistants to determine whether to fulfill a user's request. For example, suppose Bob has a privacy threshold set for Delia of five (e.g., out of ten). Suppose further that Delia issues a request to automated assistant 120 that requires data from three different data sources, and that ultimately generates an aggregate privacy score of six (assuming the aggregate score is determined by summing the individual privacy scores). In some implementations, because the aggregate privacy score of six exceeds the privacy threshold of five, Delia's request may not be fulfilled. Aggregate scores are not limited to sums of individual privacy scores. In various implementations, aggregate scores may be determined from individual privacy scores using other techniques, such as weighted sums, various equations, trained machine learning models, averages/means/medians of multiple privacy scores associated with multiple data sources, and so forth.

User-controlled data may include various data associated with each user, and may come from a variety of different data sources in the cloud and/or stored locally on client devices 106. For example, in FIG. 1, user-controlled resources engine 134 has access to cloud-based data sources such as an online calendar 142, online emails 144, social media 146, cloud storage 148, and a position coordinate service 150.

Online calendar 142 may include calendar entries and/or other data instances (e.g., reminders, to-do lists, etc.) associated with one or more user accounts. Online emails 144 may include emails and other electronic correspondence (e.g., text messages, social media posts, etc.) associated with one or more user accounts. Cloud storage 148 may store documents associated with various users (and in many cases, with one or more accounts of the user), such as documents the user stores on a so-called "cloud" drive." Cloud-based data sources may also include services that provide various user data on request, such as position coordinate service 150 which may provide, on request, a particular user's current and/or past location(s). Other data sources not specifically depicted in FIG. 1 may include data related to the user's behavior, such as search query history (e.g., search logs), past conversations with an automated assistant 120, a reminder list, a shopping list, location history, and so forth.

User-controlled data associated with a particular user may be associated with a "user account" of the user. In some instances, a user may sign into his or her user account on one or more client devices (e.g., using various credentials such as a username/password, biometrics, etc.), thereby endowing an automated assistant 120 (including the locally-executing client 118 and any online components 119) that serves the user with access to these resources. In some cases, automated assistant 120 may gain access to user-controlled data by way of the associated user account. For example, when the user installs or first engages with automated assistant client 118 on a particular client device 106, the user may grant automated assistant 120 permission to access some or all of the user-controlled data. In other words, the user effectively grants automated assistant 120 access to user-controlled data. In some cases, this may include modifying access control list 136 (or other similar security mechanism).

Each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey AutomatedAssistant"), and/or other particular user interface input. In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues.

Each of the client computing devices $106_{1-N}$ and computing devices used to implement automated assistant 120 may include one or more memories for storage of data and software applications, one or more processors for accessing data and executing applications, and other components that facilitate communication over a network. The operations performed by one or more of the client computing devices $106_{1-N}$ and/or by computing devices that implement automated assistant 120 may be distributed across multiple computer systems. Automated assistant 120 may be implemented as, for example, computer programs running on one or more computers in one or more locations that are coupled to each other through a network.

Automated assistant 120 (and in particular, cloud-based automated assistant components 119) may include intent matcher 135, a text-to-speech ("TTS") module 116, a speech-to-text ("STT") module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

STT module 117 may be configured to convert audio captured by automated assistant client 118 into text and/or to other representations or embeddings, e.g., using STT processing techniques. In some implementations, STT module 117 may be configured to leverage the virtually limitless resources of the cloud to convert audio data captured by speech capture module 110 into text, which may then be provided to intent matcher 135. In some implementations, STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are other cues detected contemporaneously, e.g., by misc. cues module 112. For example, the cloud-based automated assistant components 119 can receive audio captured by the client device $106_1$ and convert the audio to a text segment from which a request can be identified.

Misc. cues module 112 may detect a variety of cues other than audible cues, such as visual cues detected by a vision sensor (not depicted, e.g., a camera or passive infrared sensor) on client device 106. For example, a user could hold up some predetermined number of fingers when issuing a vocal request to automated assistant, and the number of fingers may be detected as a cue that is used as a parameter for the user's request. Other types of cues that may be detected by module 112 include, but are not limited to, location cues (e.g., from position coordinate sensors), wireless signals (e.g., Bluetooth, Wi-Fi, cellular), and so forth. In some implementations, TTS module 116 may be configured to convert text to computer-synthesized speech, e.g., using one or more voice synthesizers that may be, for instance, selected by a user, selected automated based on a user's region and/or demographics, etc. And as noted elsewhere herein, all or parts of modules 116, 117, and 112 may be implemented on client device 106, in addition to or instead of on the cloud.

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, other cues from module 112, etc.) provided by the user and/or based on other signals, such as sensor signals, online signals (e.g., data obtained from web services), and so forth. In some implementations, intent matcher 135 may include a natural language processor 122 and the aforementioned misc. cues module 112.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business"

node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from misc. cues module 112. In some implementations, intent matcher 135 may have access to one or more databases (not depicted) that include, for instance, a plurality of mappings between grammars, other cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, [weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or other (e.g., visual) cues. These trained machine learning models may also be stored in one or more databases and may be trained to identify intents, e.g., by embedding data indicative of a user's utterance and/or any detected user-provided other (e.g., visual) cues into a reduced dimensionality space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on other cues detected by misc. cues modules 112. For example, a user could utter something like "Order me this many cat bowls" while holding up three fingers to a visual sensor (not depicted) of client device 106. Or, a user could utter something like "Find me more movies like this" while holding of a DVD case for a particular movie.

In some implementations, automated assistant 120 may serve as an intermediary between users and one or more third party computing services (or "third party agents", or "agents", not depicted). These third party computing services may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service. For example, automated assistant 120 may provide access to an application programming interface ("API") to a service for controlling a smart device. A user may invoke automated assistant 120 and provide a command such as "I'd like to turn the heating on." Intent matcher 135 may map this command to a grammar that triggers automated assistant 120 to engage with the third party service, thereby to cause the user's heating to be switched on. The third party service may provide automated assistant 120 with a minimum list of slots that need to be filled in order to fulfill (or "resolve") a command to turn the heating on. In this example, the slots may include the temperature to which the heating is to be set, and a duration for which the heating is to be on. Automated assistant 120 may generate and provide to the user (via client device 106) natural language output that solicits parameters for the slots.

Fulfillment module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIG. 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which may be in communication with one or more search modules (not depicted) configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to a search module (not depicted). The search module may provide responsive information, such as GPS coordinates, or other more explicit information, such as "Timberline Lodge, Mt. Hood, Oreg." This responsive information may form part of the fulfillment information generated by fulfillment module 124.

Additionally or alternatively, fulfillment module 124 may be configured to receive, e.g., from natural language understanding module 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

As noted previously, a single data source may not have sufficient data to accurately respond to a request pertaining to a user. For example, user 140A may not have a habit of keeping after-work plans in his online calendar 142. If user 140B were to ask automated assistant 120 about user 140A's availability for dinner, and automated assistant 120 could only check online calendar 142, automated assistant might incorrectly inform user 140B that user 140A is available on a particular night, when in fact user 140A has plans that simply did not end up in his calendar. More generally, when users ask automated assistant 120 for information about other users, those requests are often broad and/or open-ended, and therefore may not be resolvable using a single data source.

Accordingly, in various implementations, fulfillment module 124 may generate fulfillment information, and/or natural language generator 126 may formulate natural language output, based on multiple data points retrieved from multiple different data sources, such as two or more of 142-150. That way it does not matter that online calendar 142 does not store sufficient information about the evening plans of user 140A to inform another user, such as user 140B, of whether user 140A is available to meet after work sometime soon. User 140A may exchange email or other electronic correspondence (144), and/or may update his status or communicate with others over social media (146), about his evening plans. By consulting with these additional data sources, in addition to or instead of online calendar 142, automated assistant 120 may be able to respond more effectively/accurately to a request from another user about the evening plans of user 140A.

In some implementations, automated assistant 120, e.g., by way of fulfillment module 124 and/or natural language generator 126, may formulate a natural language response based on the multiple data from the multiple data sources, and this natural language response may be associated with an aggregate privacy score. A determination may be made of whether the aggregate data score satisfies some criterion, such as not exceeding a privacy threshold. If the criterion is satisfied (e.g., the aggregate privacy score does not exceed the privacy threshold), the formulated natural language response may be output by the automated assistant to the requesting user. Otherwise the request may be denied.

Some data sources may store data that is deemed by users to be more sensitive and/or private than others. Accordingly, various techniques described herein are usable to aggregate individual privacy scores associated with these data sources and/or data obtained from these data sources, and to determine whether (or how specifically) to respond to the request based on the aggregate privacy score. For example, data sources that are available online, e.g., on a "cloud" computing system, may have lower privacy scores than, say, data sources that are only available locally on one or more client devices operated by a user. As another example, users may explicitly assign privacy scores to different data sources. For example, a user may elect to make her data from online calendar 142 less private than, say, emails from email data source 144. In some implementations, some data sources may arbitrarily or by default be assigned different privacy scores, e.g., based on general notions of privacy and/or sensitivity. For example, most users would likely agree that their personal electronic correspondence (e.g., emails, text messages) stored in 144 are more private than, say, data sources that are at least partially available to others, such as social network profiles available from 146. As another example, a user's browsing and/or search history would be considered by most users to be more private than say, a user's song playlist or restaurants that the user has recommended to others A first automated assistant 120A can receive a text segment via a client device 106₁ (or automated assistant client 118₁ of the client device 106₁). The text segment can include a request for information from a second electronic account associated with or managed by or accessed by a second automated assistant 120B. The second account can be associated with user-controlled resources, which can be referred to as or include a plurality of data sources. The user-controlled resources can be managed by a user-controlled resources engine 134. The plurality of data sources can include a calendar database (e.g., online calendar 142), location service (e.g., position coordinate service 150), or a corpus of communication associated with the second electronic account (e.g., one or more of email 144, social media 146, or cloud storage 148).

The first automated assistant 120A can be associated with a first user account, such as an account corresponding to an identifier in the ACL 136 used to access or control one or more data sources managed by the user-controlled resources engine 134. The first automated assistant 120A (e.g., via one or more component of the cloud-based automated assistant components 119) can identify a second automated assistant that corresponds to the second electronic account. The first automated assistant 120A can perform a lookup based on an identifier or indication in the request received via the client device 106₁. For example, the request, or text segment or audio input received via the client device 106₁ can include an identifier, such as a username, name or other unique identifier, that is associated with or otherwise corresponds to the second electronic account. Using the identifier (or unique identifier such as an alphanumeric identifier or other name), the first automated assistant 120A (or cloud-based automated assistant components 119) can identify a second automated assistant 120B that corresponds to the second electronic account from which the request comprising the text segment is requesting information. For example, the first automated assistant 120A can perform a lookup in ACL 136 or otherwise query the user-controlled resources engine 134 or one or more component of the cloud-based automated assistant components 119 to identify the second automated assistant 120B. The second automated assistant can be associated with a second client device such as client device 106N.

Upon identifying the second automated assistant 120B corresponding to the second electronic account, the first automated assistant 120A can transmit the request for the information to the second automated assistant 120B. The transmission can be via network, communication channel, secure communication channel, network connection, or other type of communication. In some cases, the first automated assistant and second automated assistant can reside on one or more virtual machines executing on one or more servers of a data processing system or server farm that form or are part of the cloud-based automated assistant components 119.

The second automated assistant 120B can identify, from a plurality of data sources associated with the second electronic account, a first data source and a second data source based on the request for the information. The second automated assistant 120B can select the first and second data sources based on the request. The second automated assistant 120B can parse the request to determine one or more data sources to select. In some cases, the request can include an indication of the data sources to select. For example, the first automated assistant 120B can include an indication of the data sources or types of data sources to select. The first automated assistant 120A or second automated assistant 120B can parse, process or otherwise analyze the request for information to determine the data sources to select. For example, if the request is a scheduling request, the automated assistant (e.g., 120A or 120B) can select a calendar data source such as the online calendar 142 and a location data source such as the position coordinate service 150. The second automated assistant 120B can select the calendar data source in order to determine availability information for the second electronic account. The second automated assistant 120B can select the position coordinate service 150 in order to determine a current location of the client device 106N associated with the second electronic account, which can be used to determine an amount of time it would take for the second client device 106N to travel to a destination corresponding to the scheduling request.

The second automated assistant 120B, prior to responding to the request or providing information or access to the selected first or second data sources, can determine a first privacy score associated with the first data source and a second privacy score associated with the second data source. The second automated assistant 120B (or one or more component of the cloud-based automated assistant components 119) can determine the first and second privacy scores by communicating with the ACL 136 or the user-controlled resource engine 134.

The first or second data sources can store data that is deemed by users to be more sensitive and/or private than others. For example, data sources that are available online, e.g., on a "cloud" computing system, may have lower privacy scores than, say, data sources that are only available locally on one or more client devices operated by a user. Different privacy scores can be assigned to different data sources. The assignment of privacy scores can be stored in an electronic account of the user, in the ACL 136 for a user, maintained by the user-controlled resources engine 134, or stored locally on a client device 106. For example, a user may elect to make her data from online calendar 142 less private than, say, emails from email data source 144. In some implementations, some data sources may arbitrarily or by default be assigned different privacy scores, e.g., based on general notions of privacy and/or sensitivity. For example, most users would likely agree that their personal electronic correspondence (e.g., emails, text messages) stored in 144 are more private than, say, data sources that are at least partially available to others, such as social network profiles available from 146. As another example, a user's browsing and/or search history would be considered by most users to be more private than say, a user's song playlist or restaurants that the user has recommended to others The second automated assistant 120B can determine, based on the first privacy score and the second privacy score, an aggregate privacy score associated with generation of a response to the request from the first automated assistant. The second automated assistant 120B can aggregate individual privacy scores associated with these data sources and/or data obtained from these data sources to determine whether (or how specifically) to respond to the request based on the aggregate privacy score. The second automated assistant 120B can use one or more techniques to aggregate, combined, or otherwise determine a single privacy score from multiple privacy scores. The second automated assistant 120B can determine an average privacy score from the individual privacy scores to generate the aggregate privacy score; determine a weighted average from the individual privacy scores to generate the aggregate privacy score; sum the individual privacy scores to generate the aggregate privacy score; multiple the individual privacy scores together to generate the aggregate privacy score; or otherwise combined the individual scores using a function to generate the aggregate privacy score.

Responsive to the aggregate privacy score satisfying a threshold, the second automated assistant 120B can provide, to the first automated assistant 120A, data from the first data source and the second data source. The second automated assistant 120B can compare the aggregate privacy score with a threshold or privacy criterion to determine whether the aggregate privacy score satisfies the threshold. Satisfying the threshold can refer to the aggregate privacy score being less than or equal to the threshold. For example, a higher privacy score can correspond to more private data, in which case the aggregate privacy score being less than or equal to the threshold can indicate satisfying the threshold to allow or grant access to the data from the first and second data sources. However, if a lower privacy score corresponds to more private data, then satisfying the threshold can occur by the aggregate privacy score being greater than or equal to the threshold.

In response to the determination that the aggregate privacy score satisfies the threshold, the first automated assistant can receive the information from the first and second data sources and generate, based on data from the first data source and the second data source, a natural language response to be output at the client device 106₁ in response to the determination that the aggregate privacy score satisfies the threshold. The first automated assistant 120A (or one or more server computing devices) can provide the natural language response to the client device 106₁ to cause the client device 106₁ to present an audio output comprising the natural language response. For example, a response to a request to "Is user2 available to have lunch today at noon at restaurant?" can be generated based on user2's calendar data source and location to determine whether user2 can travel to the restaurant by noon. The response can be "yes, user2 is available", "no, user2 is not available for lunch", "no, user2 is not available for lunch at noon at that restaurant, but is available to meet at the restaurant at 12:30 PM", "no, user2 is not available to meet at the restaurant at 12 PM, but can meet at restaurant2 at 12 PM," or some other response.

The one or more server computing devices (e.g., the cloud-based automated assistant components 119) can include a digital component selector 160. The digital component selector to provide, for presentation via the client device along with the natural language response, a digital component selected via a real-time digital component selection process.

The digital component selector 160 can be a part of the cloud-based automated assistant component 119 or separate from the cloud-based automated assistant component 119. The digital component selector 160 can interact, interface or otherwise communicate with the cloud-based automated assistant component 119. The digital component selector 160 can interact, interface or otherwise communicate with the fulfillment module 124. The digital component selector 160 can receive a content request or an indication thereof for the selection of a digital component based on the request. The digital component selector 160 can create a content request or generate a content request. The digital component selector 160 can execute a real-time digital component selection process to select the digital component. The digital component selector 160 can execute the real-time digital component selection process responsive to the content request. The digital component selector 160 can execute the real-time digital component selection process without a content request, such as based on a time interval, trigger, or other condition. The digital component selector 160 can select addition or supplemental digital components based on the input request.

The real-time digital component selection process can refer to, or include, selecting digital component objects (which may include sponsored digital component objects) provided by third party content providers 162. The real-time content selection process can include a service in which digital components provided by multiple content providers are parsed, processed, weighted, or matched based on request identified in the input audio signal in order to select one or more digital components to provide to the client device 106 (e.g., client device 106₁). The digital component selector 160 can perform the content selection process in real-time. For example, in response to a request a plurality of content provider devices can provide a digital component with associated bid to the digital component selector 160. Based on a ranking of the bids from each of the content provider devices, the digital component selector 160 can select one of the provided digital components. Performing the content selection process in real-time can refer to performing the content selection process responsive to the request or determination to perform the content selection process. The request can be received via the client device 106, or the request can be generated by the digital component selector 160, or triggered by one or more of the automated assistant components 119. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes).

The real-time content selection process can be performed during a communication session with the client device 106, or within a time interval after the communication session is terminated.

For example, the digital component selector 160 can be designed, constructed, configured or operational to select digital component objects based on the content request in the input audio signal. The digital component selector 160 can select digital component objects based on data from one or more data sources, such as a first data source or the second data source associated with the second electronic account. The digital component selector 160 can identify, analyze, or recognize voice, audio, terms, characters, text, symbols, or images of the candidate digital components or data sources (e.g., online calendar 142, email 144, social media 146, cloud storage 148 or position coordinate service 150) using an image processing technique, character recognition technique, natural language processing technique, or database lookup. The candidate digital components can include metadata indicative of the subject matter of the candidate digital components, in which case digital component selector 160 can process the metadata to determine whether the subject matter of the candidate digital component corresponds to the content request.

The digital component selector 160 can determine, based on a policy, to initiate a real-time digital component selection process based on the aggregate privacy score. The digital component selector 160 can use the same threshold used to determine whether to provide access to information to the data sources to generate the response to the request. The digital component selector 160 can use a different threshold as compared to the threshold used to determine whether to provide access to the data sources. The digital component selector 160 can use higher threshold, for example, as compared to the threshold used to determine whether to generate the response to the request based on information of the data sources. The digital component selector 160 can compare the aggregate privacy score with a digital selection threshold.

The digital component selector 160 can determine, based on the policy, to block initiation of a real-time digital component selection process based on the aggregate privacy score. For example, if the aggregate privacy score satisfies a digital selection threshold, then the digital component selector 160 can determine to initial a real-time digital selection process. Satisfying the digital selection threshold can refer to or include the aggregate privacy score being greater than or equal to the threshold if the higher the higher the score indicates greater access to the data source. However, if lower the aggregate privacy score indicates greater access to the data source, then the satisfying the digital selection threshold can refer to or include the aggregate privacy score being less than or equal to the threshold.

The digital component selector 160 can determine, based on the natural language response generated for output at the client device 160₁, to initiate a real-time digital component selection process. For example, if the response includes one or more keywords that are conducive to a real-time content selection process, then the digital component selector 160 can determine to select a digital component to provide with the response.

Responsive to the request identified in the text segment, input audio signal, or other signal, the digital component selector 160 can select a digital component object from a database associated with the digital component provider 162 and provide the digital component for presentation via the client device 106. The digital component object can be provided by a digital component provider 162. The digital component selector 160 can select multiple digital components. The multiple digital components can be provided by different digital component providers 162. For example, a first digital component provider 162 can provide a primary digital component responsive to the request and a second digital component provider 162 can provide a supplemental digital component that is associated with or relates to the primary digital component. The client device 106 (e.g., which can be referred to as a client computing device) or a user thereof can interact with the digital component object. The client device 106 can receive an audio, touch, or other input response to the digital component. The client device 106 can receive an indication to select a hyperlink or other button associated with the digital component object that causes or allows the client device 106 to identify digital component provider 162, request a service from the digital component provider 162, instruct the digital component provider 162 to perform a service, transmit information to the digital component provider 162, or otherwise identify a good or service associated with digital component provider 162.

The digital component selector 160 can select a digital component that includes text, strings, or characters that can be processed by a text to speech system or presentable via a display. The digital component selector 160 can select a digital component that is in a parameterized format configured for a parametrically driven text to speech technique. The digital component selector 160 can select a digital component that is in a format configured for display via client device 106. The digital component selector 160 can select a digital component that can be re-formatted to match a native output format of the client device 106 or application to which the digital component is transmitted. The digital component selector 160 can provide the selected digital component to the client device 106₁ or automated assistant client 120A or application executing on the client device 106₁ for presentation by the client device 106.

The system 100 can include one or more digital component providers 162. The digital component providers 162 can provide audio, visual, or multimedia based digital components (which can also be referred to as content, images, or supplemental content) for presentation by the client device 106 as an audio and visual based output digital components. The digital component can be or include other digital components. The digital component can be or include a digital object. The digital component can be configured for a parametrically driven text to speech technique. The digital component can be configured for text-to-speech (TTS) implementations that convert normal language text into speech. For example, the digital component can include an image that is displayed to the user and, via TTS, text related to the displayed image is presented to the user. The digital component can be input to an application programming interface that utilizes a speech-synthesis capability to synthesize text into natural-sounding speech in a variety of languages, accents, and voices. The digital component can be coded as plain text or a speech synthesis markup language (SSML). SSML can include parameters that can be set to control aspects of speech, such as pronunciation, volume, pitch, or rate that can form an acoustic fingerprint or native voice.

The digital component provider 162 can provide selection criteria for the digital component, such as a value, keyword, concept, or other metadata or information to facilitate a content selection process. The digital component provider 162 can provide video based digital components (or other digital components) to the digital component selector 160 where they can be stored in a data repository. The digital component selector 160 can select the digital components from the data repository and provide the selected digital components to the client device 106.

The digital component provider 162 can provide the digital component to the digital component selector 160 for storage in the data repository in a content data structure. The digital component selector 160 can retrieve the digital component responsive to a request for content from the client device 106 or otherwise determining to provide the digital component.

The digital component provider 162 can establish a digital component campaign (or electronic content campaign). A digital component campaign can refer to one or more content groups that correspond to a common theme. A content campaign can include a hierarchical data structure that includes content groups, digital component data objects (e.g., digital components or digital objects), and content selection criteria. To create a digital component campaign, digital component provider 162 can specify values for campaign level parameters of the digital component campaign. The campaign level parameters can include, for example, a campaign name, a preferred content network for placing digital component objects, a value of resources to be used for the digital component campaign, start and end dates for the content campaign, a duration for the digital component campaign, a schedule for digital component object placements, language, geographical locations, type of computing devices on which to provide digital component objects. In some cases, an impression can refer to when a digital component object is fetched from its source and is countable. Due to the possibility of click fraud, robotic activity can be filtered and excluded, as an impression. Thus, an impression can refer to a measurement of responses from a Web server to a page request from a browser, which is filtered from robotic activity and error codes, and is recorded at a point as close as possible to opportunity to render the digital component object for display on the computing device 104. In some cases, an impression can refer to a viewable or audible impression; e.g., the digital component object or digital component is at least partially (e.g., 20%, 30%, 30%, 40%, 50%, 60%, 70%, or more) viewable on a display device of the client device 106, or audible via a speaker of the client device 106. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The digital component provider 162 can establish one or more content groups for a digital component campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for content group level parameters, such as keywords, negative keywords (e.g., that block placement of the digital component in the presence of the negative keyword on main content), or parameters associated with the content campaign.

To create a new content group, the digital component provider 162 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the digital component provider 162 can use to capture a topic or subject matter for which digital component objects of the content group is to be selected for display. For example, a food and beverage company can create a different content group for each brand of food or beverage it carries, and may further create a different content group for each model of vehicle it carries. Examples of the content group themes that the food and beverage company can use include, for example, "Brand A cola", "Brand B ginger ale," "Brand C orange juice," "Brand D sports drink," or "Brand E purified water." An example content campaign theme can be "soda" and include content groups for both "Brand A cola" and "Brand B ginger ale", for example. The digital component (or digital component object or digital component) can include "Brand A", "Brand B", "Brand C", "Brand D" or "Brand E".

The digital component provider 162 can provide one or more keywords and digital component objects to each content group. The keywords can include terms that are relevant to the product or services of associated with or identified by the digital component objects. A keyword can include one or more terms or phrases. For example, the food and beverage company can include "soda," "cola," "soft drink," as keywords for a content group or content campaign that can be descriptive of the goods or services the brand provides. In some cases, negative keywords can be specified by the content provider to avoid, prevent, block, or disable content placement on certain terms or keywords. The content provider can specify a type of matching, such as exact match, phrase match, or broad match, used to select digital component objects.

The digital component provider 162 can provide the one or more keywords to be used by the digital component selector 160 to select a digital component object provided by the digital component provider 162. The digital component provider 162 can provide additional content selection criteria to be used by the digital component selector 160 to select digital component objects. The digital component selector 160 can run a content selection process involving multiple content providers 138 responsive to receiving an indication of a keyword of an electronic message.

The digital component provider 162 can provide one or more digital component objects for selection by the digital component selector 160. The digital component objects can be a digital component or a collection of digital components. The digital component selector 160 can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. Upon selecting a digital component, the digital component selector 160 can transmit the digital component object for presentation or rendering on a client device 106 or display device of the client device 106. Presenting or rendering can include displaying the digital component on a display device or playing the digital component via a speaker of the client device 106. The digital component selector 160 to present or render the digital component object. The digital component selector 160 can instruct the client device 106 to generate audio signals, acoustic waves, or visual output. For example, the automated assistant client 108 can present the selected digital component via an audio output.

The digital component selector 160 can provide, for render on a display device of the client device 106 (e.g., user interface output devices 1020), a digital component selected via the real-time digital component selection process. The digital component selector 160 can determine, based on a policy, to initiate a real-time digital component selection process. The digital component selector 160 can retrieve the policy from a data repository or memory of the cloud-based automated assistant component 119, or a server thereof. The policy can include a computing resource reduction policy, network bandwidth utilization reduction policy, preferences, performance-related policy, content-related policy or other type of policy.

For example, the policy can be a computing resource reduction policy. The policy can determine, based on a type of client device 106, whether or not to provide a digital component for render by the client device 106. For example, if the client device 106 does not have access to a user interface output device 820 that includes a display, then the digital component selector 160, using the policy, can block execution of the real-time digital component selection process. If the client device 106 has access to a user interface output device 820 that includes a display, then the digital component selector 160, using the policy, can determine to execute the real-time digital component selection process.

The policy can take into account the aggregate privacy score based on the one or more data sources selected responsive to the request for information based on the text segment. The digital component selector 160 can determine, using the policy, whether or not to execute or block execution of the real-time digital component selection process based on the aggregate privacy score. For example, if the aggregate privacy score satisfies a threshold or digital component selection threshold, then the digital component selector 160, using the policy, can determine to select a digital component for rendering by the client device 106. In some cases, if the aggregate privacy score does not satisfy the threshold or the digital component selection threshold, then the digital component selector 160, using the policy, can determine to block execution of the digital component real-time selection process.

For example, if the aggregate privacy score does not satisfy the threshold, then the first automated assistant 120A may not have access to the information from the first and second data sources. Performing a real-time digital selection process without the information from the first and second data sources may result in inaccurate results, less relevant results, erroneous results, or low performance (e.g., low interaction rate with the digital component object), which may result in wasted computing resources such as processor utilization, network bandwidth utilization, or memory utilization because the real-time digital component selection process may result in the selection and presentation of a digital component that is not utilized. Thus, to prevent wasted computing resources utilization, the computing resource reduction policy can determine to block or not to perform a real-time digital component selection process if the aggregate privacy score is less than a threshold that prevents access to information from or based on the data sources.

The digital component selector 160 can identify a computing resource reduction policy. The digital component selector 160 can determine, via the computing resource reduction policy, to block execution of a real-time digital component selection process based on the aggregate privacy score. However, the digital component selector 106 can then detect an indication of a change in the aggregate privacy score to a second aggregate privacy score (e.g., based on different data sources or different parameters). The digital component selector 160 can determine, via the computing resource reduction policy, to initiate execution of a real-time digital component selection process based on the second aggregate privacy score. The digital component selector 160 can provide, to the client device 106, a digital component selected via the real-time digital component selection process.

Figure 2A:
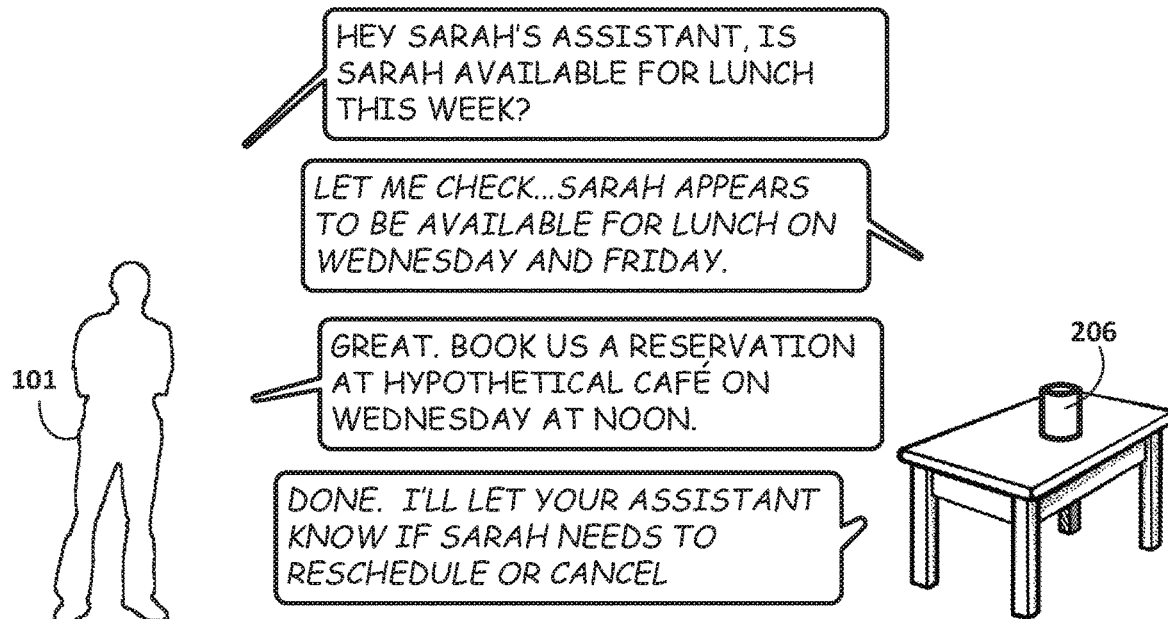
FIGS. 2A and 2B depict an example scenario of a dialog between a user and an automated assistant in which disclosed techniques are employed, in accordance with various implementations.
Figure 2B:
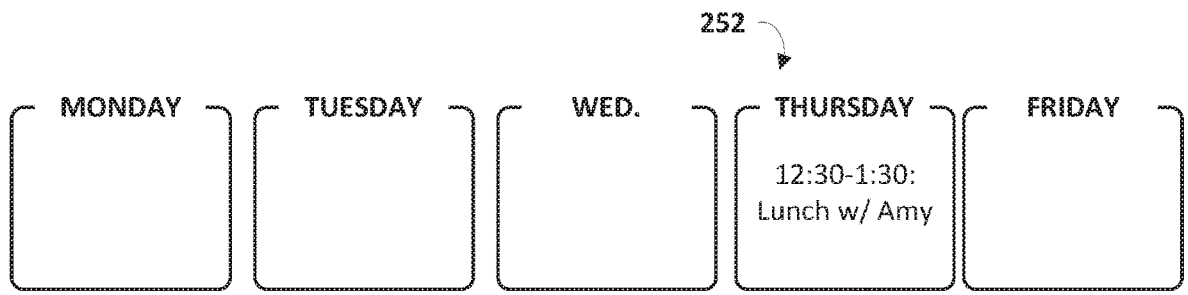
Figure 2B:
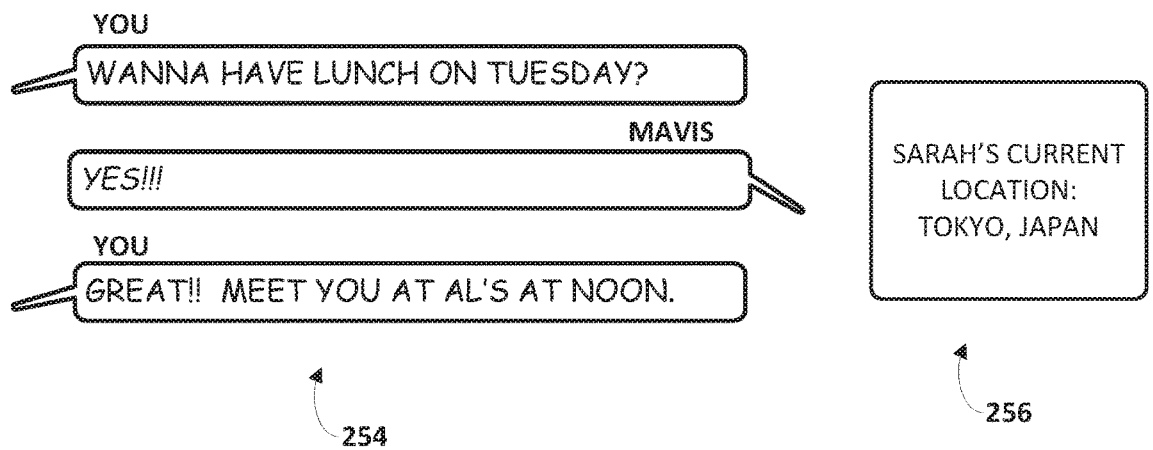

FIGS. 2A and 2B demonstrate one example of how a human-to-computer dialog session between user 101 and an instance of automated assistant (120A or B in FIG. 1, not depicted in FIG. 2) may occur, via the microphone(s) and speaker(s) of a client computing device 206 (depicted as a standalone interactive speaker but this is not meant to be limiting) according to implementations described herein. One or more aspects of automated assistant 120 may be implemented on the computing device 206 and/or on one or more computing devices that are in network communication with the computing device 206.

In FIG. 2A, user 101 ("Dave") provides natural language input of "Hey Sarah's assistant, is Sarah available for lunch this week?" in a human-to-computer dialog session between the user 101 and automated assistant 120. In response to Dave's addressing Sarah's assistant ("Hey Sarah's assistant"), in some implementations, automated assistant 120 may transition into a mode in which it attempts to mimic Sarah's experience when she engages with automated assistant 120. For example, in some implementations, automated assistant 120 may activate the same voice synthesizer as is used by Sarah when she engages with automated assistant 120. Assuming Sarah prefers a different voice synthesizer for her interactions with automated assistant 120 than Dave, using Sarah's preferred synthesizer when providing natural language output to Dave will provide Dave an experience akin to speaking with Sarah's assistant, rather than with his own.

Dave's request also seeks Sarah's availability for lunch this week. In various implementations, automated assistant 120 may interact with user-controlled resources engine 134 to consult with multiple data sources to determine Sarah's availability, and/or whether Dave should be provided with a response. FIG. 2B depicts examples of multiple data sources that may be consulted to determine Sarah's availability lunch. In this example these data sources include Sarah's electronic calendar 252 (which may be stored, for instance, in 142), an email message exchange thread 254 between Sarah and another user named Mavis (obtained from 144), and Sarah's current or last-known location 256 (which in some implementations may be acquired from position coordinate service 150). Additional or alternative data sources may be considered for any given scenario.

Assume for this example that Dave and Sarah are family members or close friends. Consequently, Sarah may have a relatively lenient or permissive privacy criterion set for Dave. For instance, Sarah may have selected a relatively high privacy threshold for Dave of, for instance, nine of ten. In some implementations this privacy threshold may be stored in ACL 136, e.g., in association with Sarah's user profile. Suppose further that Sarah has set, for her online calendar 252, a privacy score of two, and that Sarah has set, for her message exchange 254 and current location 256, privacy scores of three each. These privacy scores may indicate that Sarah considers her emails and current location to be more sensitive than her online calendar. In some implementations, Sarah may set these scores manually. Additionally or alternatively, in some implementations, these scores may be set in other ways, such as by default. Moreover, these scores may vary depending on users and/or the context from which the information is gathered. For example, suppose that message exchange thread 254 was drawn from Sarah's social media page, rather than from her private emails. In such a scenario, a privacy score for social media messages may, in some cases, be lower than email, such as two or even lower (especially if the message exchange occurred on a publicly-viewable portion of Sarah's social media profile).

Suppose it is currently Monday morning when Dave submits his request, and that Dave will be located on the west coast of the United States throughout the week (e.g., determined from his own calendar and/or other data sources). To determine when Sarah is available for lunch the remainder of the week, all three sources 252-256 may be consulted, e.g., by fulfillment module 124. Sarah's online calendar 252 eliminates Thursday from contention, leaves open the remainder of the week, and triggers a first privacy score of two. Sarah's message exchange thread 254 eliminates Tuesday from contention, and triggers a second privacy score of three. And given the fact that Sarah's current location 256 is in Japan (triggering a third privacy score of three), lunch on Monday is also out of the question. The only days in which Sarah is available for lunch are Wednesday and Friday.

With this information, automated assistant 120, e.g., by way of natural language generator 126, may formulate an appropriate natural language response. However, before this occurs, automated assistant 120 may compare an aggregate privacy score—e.g., a sum of the first, second, and third privacy scores mentioned above—to Sarah's privacy threshold for Dave. The aggregate score is eight (2+3+3) and the threshold is nine. Accordingly, and referring back to FIG. 2A, automated assistant 120 responds, "Let me check . . . Sarah appears to be available for lunch on Wednesday and Friday." However, if Dave and Sarah were not as close, and Sarah had a lower privacy threshold set for Dave, then the aggregate privacy score (eight) might meet or exceed the threshold, in which case automated assistant 120 might reply, "I'm sorry Dave, I'm afraid I can't do that." In some implementations, Sarah also may or may not be notified of Dave's request and/or resulting response.

Privacy thresholds for particular users or groups of users need not be static, nor are they required to always be the same for a particular user. In various implementations, privacy thresholds may be dynamic, e.g., generated or calculated on the fly. This is particularly beneficial because users are not required to manually set permissions for all other users. Rather, privacy thresholds can be determined automatically, based on a variety of signals and using a variety of techniques. In some implementations, a privacy threshold for a requesting user may be determined at the time of the requesting user's request, e.g., using one or more trained machine learning models. For example, various attributes of the requesting user and/or their request, their context, the subject user's context, the data sources required to fulfill the request, etc., may be used to assemble a feature vector associated with the request (or the user). This feature vector may then be embedded into a latent space (also referred to as a "reduced dimensionality embedding") that also includes embeddings of other requests (or users). Euclidian distance(s) between the various embeddings may be determined. In some implementations, privacy thresholds associated with the "closest" other requests in the latent space may be used to determine the privacy threshold for the current request (or for the requesting user), e.g., as an average or median of those scores.

In some implementations, a history of requests from a particular user may be considered when determining a privacy threshold for the user and/or their request. Using brute force, a malicious user could string together a multitude of individual requests, each by itself being relatively innocuous, but the information provided in response to all the requests collectively could be more revealing than a subject user may desire. As an example, a malicious user could ask, "Is John on vacation on May $1^{st}$? Is John on vacation May $2^{nd}$?," etc., to ascertain a general idea of John's comprehensive schedule, which John may not wish to disclose. Accordingly, in some implementations, a requesting user's privacy threshold may decrease (i.e., become more easily violated) the more questions they ask, especially in a particular time period (e.g., within a few minutes, an hour, a day, etc.).

Additionally or alternatively, in some implementations, a requesting user's privacy threshold may be determined based on a breadth of their request, i.e., a measure of specificity or granularity associated with the request. Put another way, the breadth of the requesting user's request may be used to determine how strictly it should be scrutinized for privacy concerns. This may reduce the likelihood of the requesting user being able to infer specific pieces of information about the other user from general answers.

For example, a request that seeks highly specific information (e.g., "Where will Delia be at 11 PM tomorrow night?") may be subject to relatively strict scrutiny. The privacy threshold may be set relatively low, and therefore, may be more easily matched and/or exceeded (in which case the request would be denied). By contrast, a request seeking coarser, less specific information (e.g., "Is Findlay available for Dinner tomorrow or Wednesday?") may be subject to less strict scrutiny. For example, the privacy threshold may be set relatively high, and therefore, may be more difficult to violate. As another example, a general or broad request such as "Does George like historical fiction?" may be subjected to less scrutiny (e.g., an aggregate privacy score associated with the response may be compared to a relatively high privacy threshold) than, say, a highly specific request such as "Does George already own an electronic copy of 'Gone with the Wind'?" As another example, a relatively broad request such as "Does Antoine like seafood?" may be subjected to less scrutiny than, say, a highly-specific request such as "How often does Antoine eat seafood?"

In some implementations, a request's breadth may be determined based at least in part on the resulting fulfillment information (which, recall, may be used to generate natural language output). For example, the number of distinct data sources required to fulfill the request may be considered, e.g., with the greater number of data sources required being associated with a greater breadth than, say, a relatively low number of data sources. Intuitively, the more data sources drawn from to generate fulfillment information, the more difficult it is to infer a particular piece of data being from a particular source.

Additionally or alternatively, in some implementations, a request's breadth may be determined based on aspects of the request itself. For example, in some implementations, the number of terms in the request may be considered, e.g., with less terms being indicative of greater breadth, and vice versa. As another example, the number of times a request is encountered, e.g., across a population of users, may be considered. In some such implementations, the more frequently the same request or semantically/syntactically similar requests are encountered, the greater the request's breadth, and vice versa.

Figure 3:
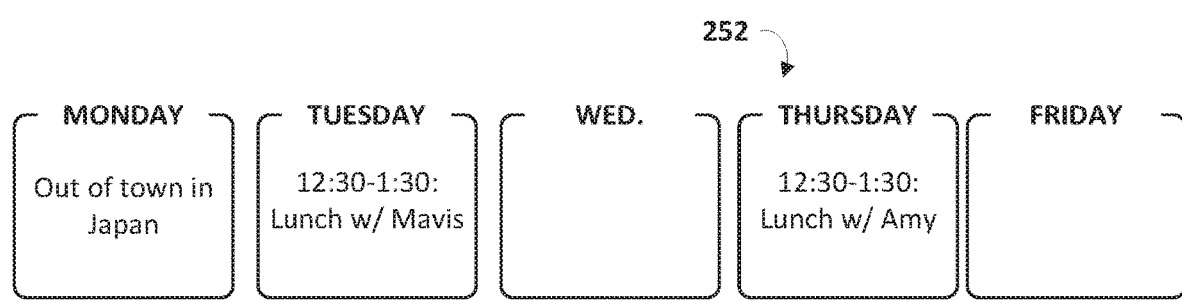
FIGS. 3, 4, and 5 depict additional example scenarios in which disclosed techniques may be employed.

FIG. 3 sets up an alternative to the scenario depicted in FIGS. 2A-2B. Rather than formulating a response to Dave's FIG. 2A request from three separate data sources, in FIG. 3, a response is formulated from a single data source—Sarah's online calendar 252. In this example, Sarah has created calendar entries that indicate lunch conflicts Monday, Tuesday, and Thursday. While it is still possible to determine that Sarah is available for lunch on Wednesday and Friday from online calendar 252, this determination is now made from a single data source. Consequently, in some implementations, Dave's request may be considered relatively narrow, and the privacy threshold vis-à-vis Dave and his request may therefore be set relatively low, e.g., much lower than the scenario depicted in FIG. 2B. It might be the case that the lowered threshold results in Dave's request being denied. However, that is not guaranteed, especially since Sarah's online calendar 252 has a relatively low privacy score of two, which means Dave's request might be granted even with the lowered privacy threshold generated based on the narrow breadth of his request.

Figure 4:
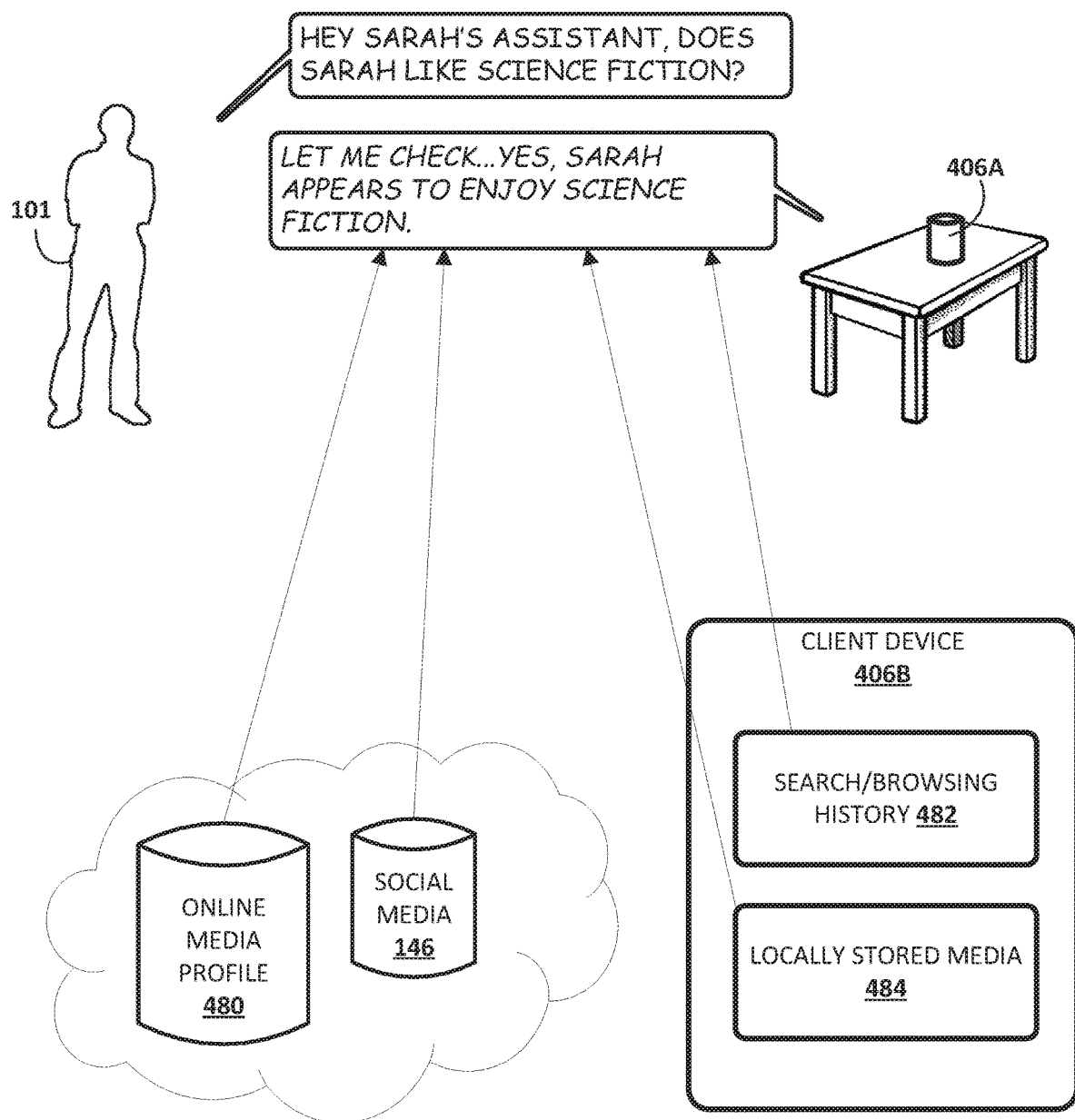

FIG. 4 depicts another dialog between the user Dave 101 and his automated assistant 120 operating on a computing device 406A during a different session. In this example, Dave provides the free-form natural language input request, "Hey Sarah's assistant, does Sarah like Science Fiction?" In this example, automated assistant 120 consults four different data sources to determine that Sarah does like science fiction, and to formulate the response, "Yes, Sarah appears to enjoy science fiction." Two of the data sources are cloud-based, and include an online media profile 480 and the aforementioned social media 146. Online media profile 480 may contain information about books, movies, podcasts, etc. that have been or are to be recommended to Sarah based on various signals, such as her shopping history, search history, media consumption history, etc. Social media 146 may include, for instance, comments made by Sarah on her status page or to other social media users that are useful for gauging her interest in science fiction (e.g., "I loved the original 'Alien' movie, and the first sequel."). It could also include, for instance, comments made by Sarah on various message threads, such as comments at the end of articles, etc.

Two additional data sources in FIG. 4 are available locally on a client device 406B operated by Sarah. These include a search/browsing history 482 and locally-stored media 484. For example, Sarah's searching and/or browsing history may reveal a likely interest by Sarah in science fiction. Additionally, if media stored locally on Sarah's client device 406B includes substantial science fiction content (e.g., determined from metadata), that may also indicate an interest by Sarah in science fiction. In some implementations, data sources that are only available locally on client devices, such as 482-484 in FIG. 4, may be deemed more private and/or sensitive than other data sources available, for instance, on the cloud (e.g., 480, 146). Consequently, these local data sources may have higher privacy scores associated with them than other online sources.

In FIG. 4, data is drawn from all four data sources to determine that Sarah likes science fiction, as indicated by the arrows. In some implementations, drawing data from such a large number of data sources results in the request being interpreted as having relatively large breadth. This in turn may result in a relatively high privacy threshold (difficult to violate) being established, at least for this particular request from Dave. But that isn't to say Dave always will be according such a high privacy threshold when requesting information about Sarah.

Figure 5:
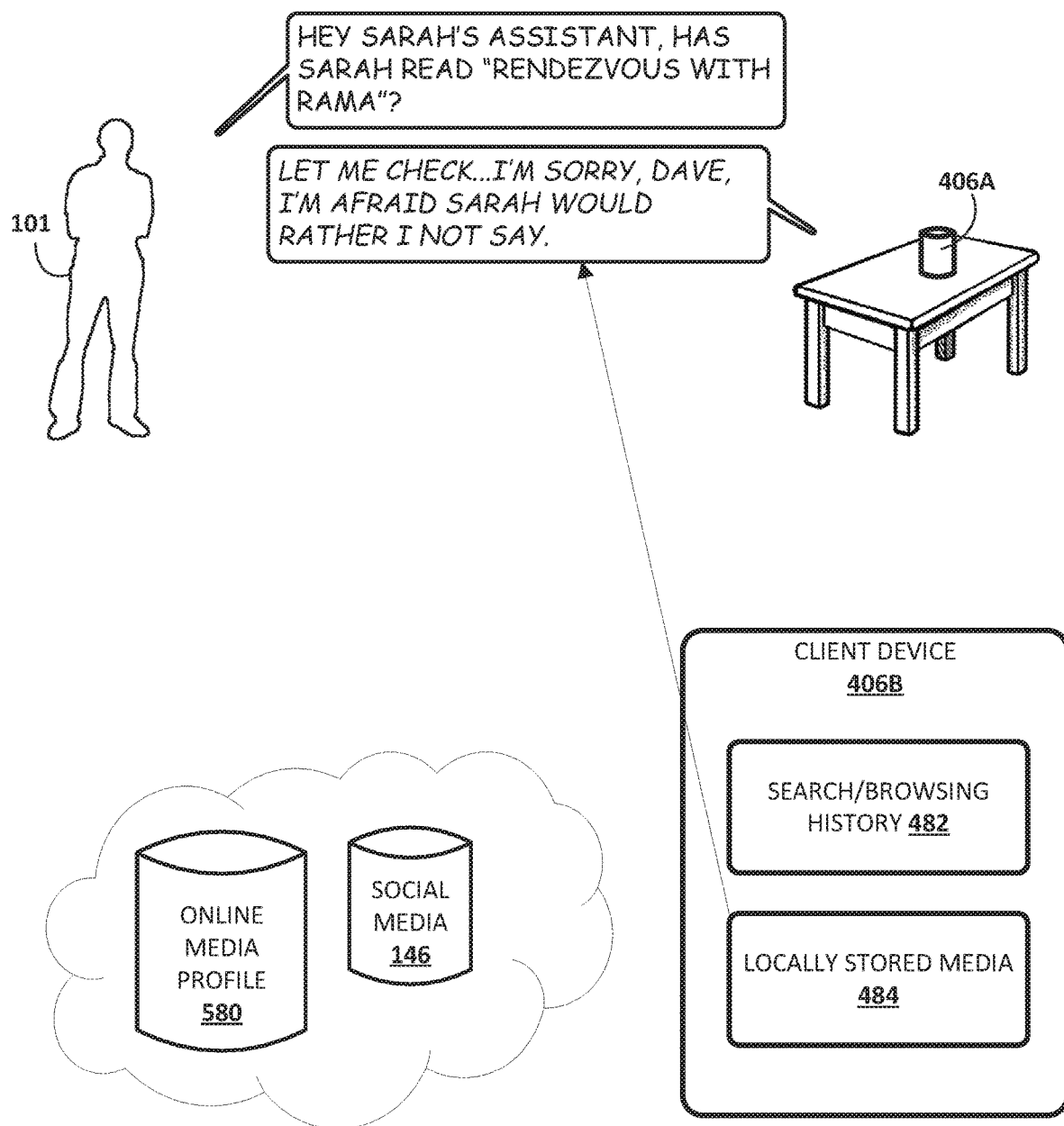

For example, in FIG. 5 (in which the components are the same as in FIG. 4), Dave makes a much narrower request, "has Sarah read 'Rendezvous with Rama'?" In this instance, automated assistant 120 is able to determine, from a single data source, that Sarah has read that book. In particular the single data source is locally stored media 484 of Sarah's client device 406B, where Sarah might have an electronic copy of the book stored (and in some cases it may be labeled with metadata indicating that Sarah has read it). The other data sources depicted in FIG. 5 (580, 146, 482) didn't provide any help in answering Dave's request. Accordingly, even though an answer to Dave's request was ascertained, in FIG. 5, automated assistant 120 tells Dave that it cannot provide that information. This may be because, for instance, Dave's request was interpreted as having narrow breadth, e.g., due to it being answered based on data obtained from a single data source (484).

As noted previously, in some implementations, Sarah may or may not be notified of Dave's request and/or whether the request was fulfilled. In the above example Dave may be looking for a birthday for present for Sarah. Notifying Sarah of Dave's request about "Rendezvous with Rama" may clue Sarah in to the fact that Dave is shopping for her birthday present, and that he's likely to get her a science fiction book. Accordingly, in some implementations, Sarah may receive no notification, or may receive a push notification (e.g., a pop up card on her lock screen) that indicates Dave made a request about her, but that doesn't inform her about the specific request. That way Sarah can avoid reading Dave's specific request, e.g., so that she can still be surprised by his present. In some implementations, automated assistant 120 may determine, e.g., from Sarah's calendar, that Sarah's birthday (or another present-giving occasion) is going to occur soon. Based on that determination, automated assistant 120 may determine that Dave's request likely relates to purchase of a birthday present for Sarah, and thereby might take various steps to avoid spoiling Sarah's surprise, such as by not notifying Sarah of the request, obscuring the request, leaving the notification of the request vague or ambiguous, etc.

Figure 6:
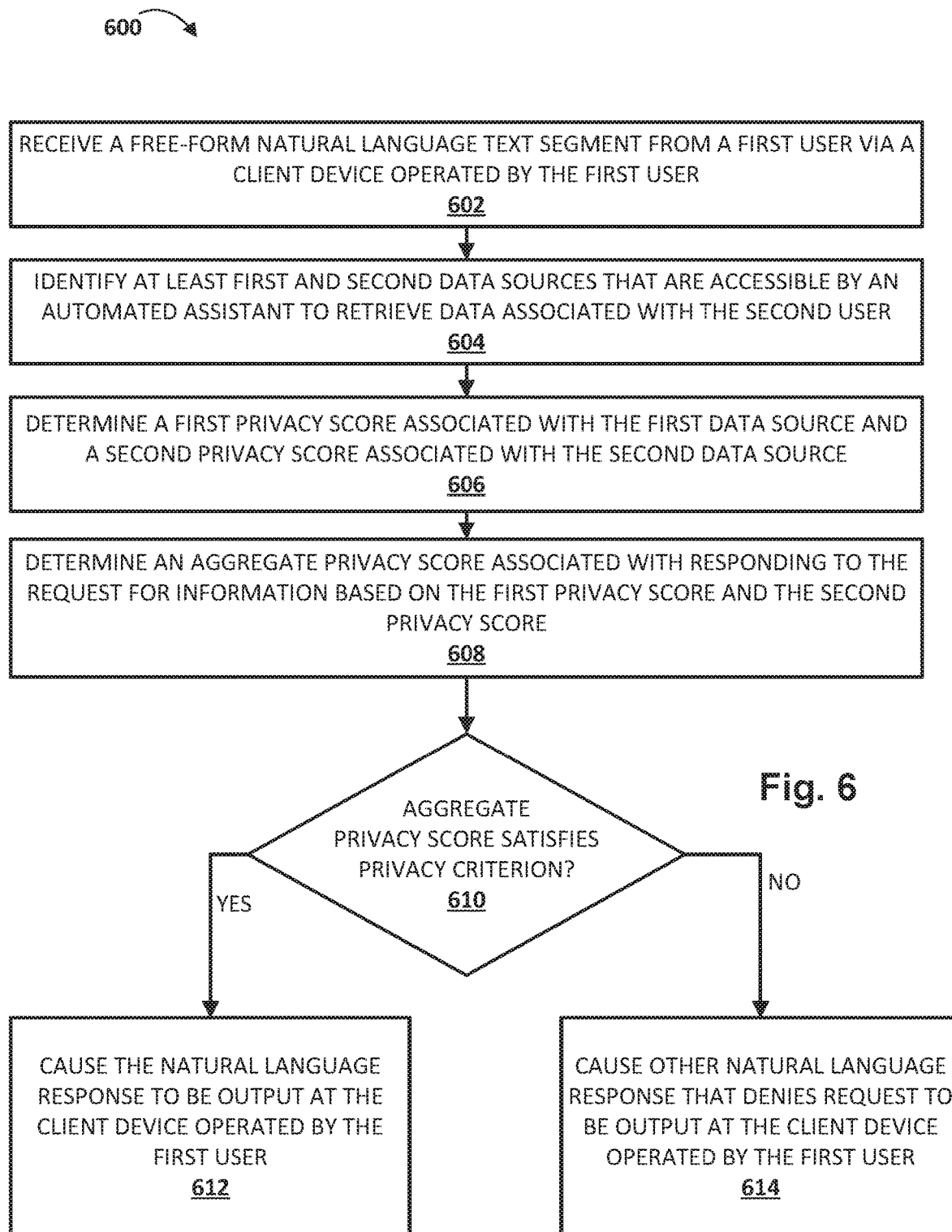
FIG. 6 depicts a flowchart illustrating an example method according to implementations disclosed herein.

FIG. 6 is a flowchart illustrating an example method 600 according to implementations disclosed herein. For convenience, the operations of the flow chart are described with reference to a system that performs the operations. This system may include various components of various computer systems, such as one or more components of automated assistant 120. Moreover, while operations of method 600 are shown in a particular order, this is not meant to be limiting. One or more operations may be reordered, omitted or added.

At block 602, the system may receive a free-form natural language text segment from a first user (e.g., 140A) via a client device (e.g., $106_1$) operated by the first user. In various implementations, the free-form natural language text segment may include a request for information pertaining to a second user (e.g., 140B). For example, the requested information may be information that can be formulated based on data created by and/or wholly or partially under the control of the second user. The request may be received as speech that is then converted to text (e.g., by module 117) and/or as typed textual input. In some implementations, the request may be submitted by a first user (caller) who is attempting to make a telephone call (e.g., using cellular, VOIP, etc.) to a second user. If the second user is not available to take a call, the first user may be connected to an automated assistant that may or may not operate at least in part on the first user's smart phone or the second user's smart phone.

In many implementations, the request may be targeted by the first user to the second user's automated assistant. As noted above, in some implementations, each user may not actually have a distinct automated assistant that serves them. Rather, each user may have an automated assistant client 118 that interfaces with cloud-based automated assistant components 119 to provide the user with an experience akin to having their own personalized virtual assistant. To this end, in some implementations, each user may select attributes of their automated assistant, such as a voice synthesizer to be employed by their automated assistant. Consequently, in some implementations when a first user attempts to engage with an automated assistant that serves a second user, a voice synthesizer selected by the second user when they engage with automated assistant 120 may be used to communicate with the first user, thereby giving the illusion to the first user of speaking with the second user's automated assistant.

In some implementations, a requesting user may ask their own assistant to ask someone else's assistant for information (e.g., "Hey assistant, will you ask Sarah's assistant if she likes science fiction?"). Additionally or alternatively, in some implementations, a user may engage with another user's assistant by calling the other user's telephone (or, more generally, attempting to establish some sort of voice communication session with the other user) while the other user is busy, on another call, etc. The calling user may be presented with an automated assistant interface that mimics the other user's automated assistant, at which point the calling user can make requests. And requests are not limited to voice-based requests. In various implementations, a user may engage with another user's automated assistant using other input/output modalities, such as visual (e.g., using message exchange application 107).

Referring back to FIG. 6, at block 604, the system may identify at least first and second data sources that are accessible by automated assistant 120 to retrieve data associated with the second user. In various implementations, the first and second data sources (and any number of additional resources as necessary) may collectively include sufficient data to generate responsive fulfillment information and/or formulate a natural language response to the request for information, whereas neither of the sources might have had sufficient data alone.

At block 606, the system may determine a first privacy score associated with the first data source and a second privacy score associated with the second data source. At block 608, the system may determine an aggregate privacy score associated with responding to the request for information. In some implementations, this aggregate score may be based on the first privacy score and the second privacy score, e.g., a sum of the two scores. In some implementations, when fulfillment module 124 assembles the fulfillment information necessary for natural language generator 126 to formulate a natural language response, fulfillment module 124 may attach the aggregate privacy score to the fulfillment information.

As noted above, privacy scores associated with data sources (e.g., 142-150, 252-256, 480-484) may be selected by the user, set by default, learned over time (e.g., using machine learning models), and so forth. Additionally or alternatively, in some implementations, privacy scores for each data source may be weighted, e.g., based on a number of individual data points drawn from that particular data source relative to other data sources. For example, if a user's online calendar is used to determine that they are unavailable for dinner on three days, and the user's emails are used to determine that the user is unavailable on a fourth day, the user's online calendar may be weighted more or less heavily than the user's email.

At block 610, the system may determine whether that aggregate privacy score determined at block 608 satisfies a privacy criterion. As noted above, in some implementations, the privacy criterion may take the form of a privacy threshold. A privacy threshold may be set for particular users (e.g., Sarah sets a privacy threshold for any request from Dave) or requests, and/or may be determined dynamically, e.g., based on a breadth of the request, a number of data sources required to fulfill the request, etc. In some implementations, satisfying the privacy criterion means not meeting or exceeding the privacy threshold.

If the answer at block 610 is yes, then at block 612, the system may cause the natural language response to be formulated and/or output at the client device operated by the first user. The natural language response may be output in various ways, such as audibly, visually (e.g., by message exchange client 107), and so forth. In some implementations, the user about which the request was made may also be notified of the request and/or its fulfillment. However, if the answer at block 610 is no, then at block 614, the system may cause the client device to output other natural language output denying the request received at block 602. Similar to block 612, in some implementations, the user about which the rejected request was made be notified of the request and/or its denial. And as noted above, in some implementations, the subject user may or may not be notified of the request and/or its fulfillment or denial, depending on whether it would be desirable to maintain some level of surprise for the subject user.

Requests as described herein are not necessarily limited to requests for information. For example, a first user may request that an automated assistant engage with a resource that is controlled by a second user. The automated assistant may only be permitted to engage with that resource if it determines, e.g., using techniques described herein, that the first user should be granted such permission. As a non-limiting example, a child may ask an automated assistant to purchase something from an online marketplace. The automated assistant may determine an aggregate privacy score associated by the request based on a variety of different factors, such as the trustworthiness of the online market place, a privacy score associated with a data source (e.g., mom's credit card), and so forth. This aggregate privacy score may be compared to a privacy threshold established for the child with regard to, for instance, the child's mother or father. Other responsive actions that may be authenticated using techniques described herein include but are not limited to operating home appliances (e.g., should a guest be permitted to adjust the thermostat?), changing lighting scenery, locking/unlocking doors, etc.

Figure 7:
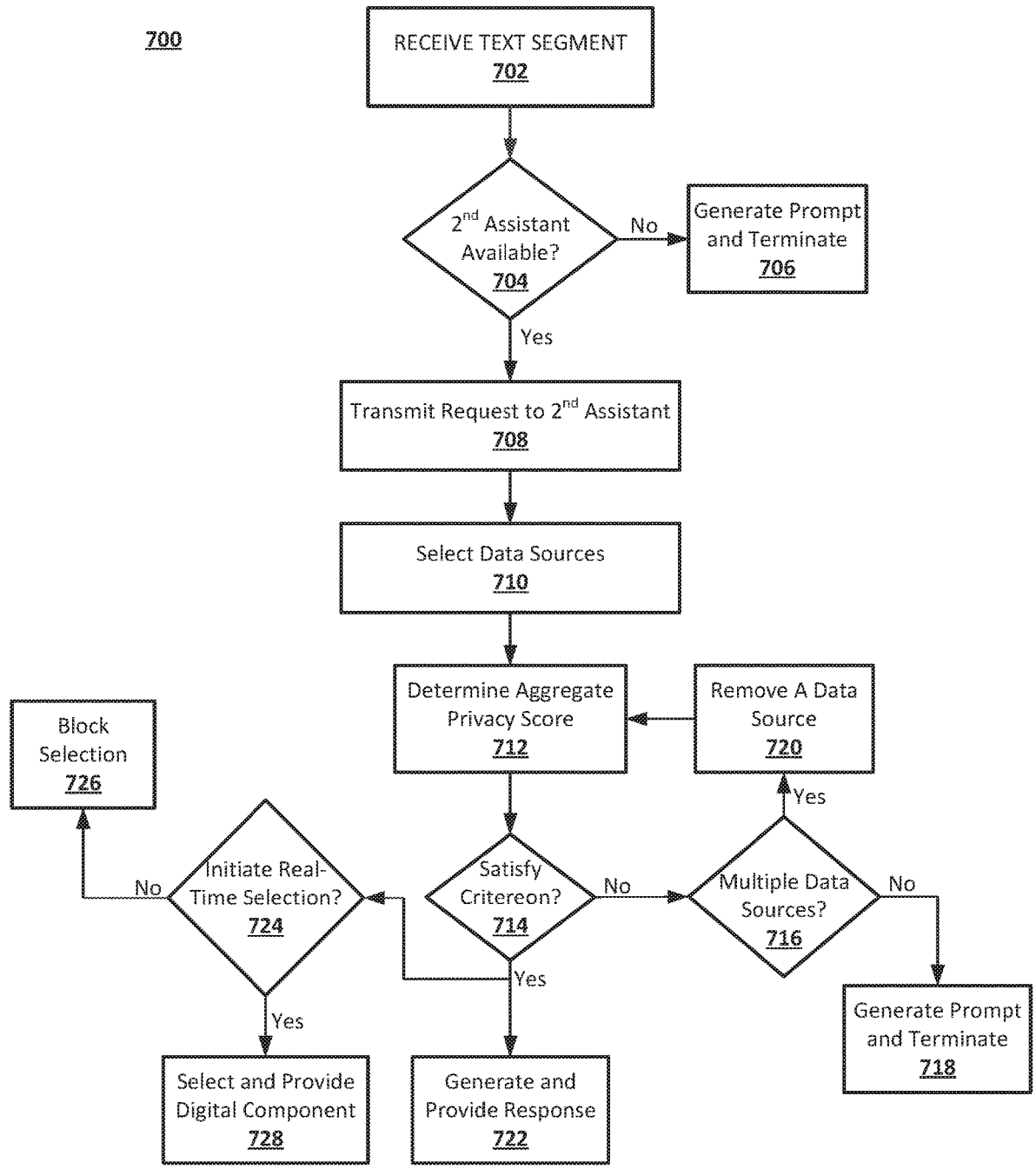
FIG. 7 depicts a flowchart illustrating an example method of assembling responses from automated assistants according to implementations disclosed herein.

FIG. 7 depicts a flowchart illustrating an example method of assembling responses from automated assistants according to implementations disclosed herein. The method 700 can be performed by one or more component or system depicted in FIG. 1, 4, 5 or 8, including, for example, cloud-based automated assistant components 119, a first automated assistant 120A, a second automated assistant 120B, a client device $106_1$ a client device 106N, or a user-controlled resources engine 134. The method 700 can be performed by one or more computing devices 710 (which can be referred to as server computing devices). At 702, a first automated assistant executed by one or more server computing devices receives a text segment via a client device associated with a first electronic account. The text segment can include a request for information from a second electronic account associated with a plurality of data sources. The request can be received as an input audio signal. The request can be received via one or more data packets over a network. The request can be detected by a microphone or sensor of a client computing device. The request can be a voice-based request. The request can be received via a graphical user interface presented by the client device. The request can include a query or command.

At 704, the one or more server computing devices can determine whether a second assistant is available. The second assistant can refer to an automated assistant. The second assistant can be associated with the second electronic account that corresponds to a plurality of data sources containing information that is requested by the input text segment received by the first automated assistant. To obtain the request information, the one or more server computing devices can determine whether a second automated assistant is configured, operational or otherwise operational for the second electronic account. For example, the one or more server computing devices (or first automated assistant) can transmit a query or a ping to the second electronic account to determine whether a second automated assistant for the second electronic account is operational. If the first automated assistant does not receive a response, then the first automated assistant can determine that a second assistant is not configured for the second electronic account, and then terminate the process at 706. The one or more servers can generate a prompt indicating that the requested information from the data sources is not accessible or available, and provide the prompt to the first automated assistant for presentation via the first client device.

If, however, the one or more server computing devices determines at 704 that a second automated assistant is available, the first automated assistant can transmit the request for the information from the second electronic account to the second assistant configured for the second electronic account at 708. At 710, the second automated assistant can select one or more data sources responsive to the request for information received from the first automated assistant. The one or more data sources can include, for example, online calendar information, email information, social media information, cloud storage information, or location information.

At 712, the one or more servers (e.g., second automated assistant) can determine an aggregate privacy score 712. The aggregate privacy score can be based on an individual privacy score for each of the data sources selected at 710. The one or more servers can generate the aggregate privacy score by combining the individual privacy scores. The one or more servers can determine whether the aggregate privacy score satisfies a criterion at 714. Satisfying a criterion can refer to or include satisfying a threshold. If the one or more servers determines that the aggregate privacy score does not satisfy the criterion, then the one or more servers can proceed to determine whether there are multiple data sources at 716. The multiple data sources can refer to the data sources selected at 710. If the one or more servers selected multiple data sources at 710, then at 716 the one or more servers can determine that there are multiple data sources that are contributing to the aggregate privacy score determined at 712 which are determined to not satisfy the criterion at 714.

In some cases, the one or more servers can remove a data source at 720. The one or more servers can remove a data source based on the individual privacy score of the data source. For example, the one or more servers can rank the data sources based on the individual privacy scores of the data sources in order to identify a highest ranking data source or lowest ranking data source. The one or more servers can remove one of the highest ranking or lowest ranking data sources in order to facilitate the aggregate privacy score satisfying the criterion at 714. For example, if satisfying the criterion at 714 is based on the aggregate privacy score being greater than or equal to a threshold, then the one or more servers can remove a lowest ranking privacy score at 720. If, satisfying the criterion at 714 is based on the aggregate privacy score being less than or equal to a threshold, then the one or more servers can remove a highest ranking data source at 720. The one or more servers at determine the aggregate privacy score again at 712, but without the data source that was removed.

At 714, if the one or more servers determines that the aggregate privacy score satisfies the criterion, the one or more severs can proceed to generate and provide a response based on the data sources at 722. If the one or more servers determines that the aggregate privacy score satisfies the criterion, the one or more severs can proceed to determine whether to initiate a real-time selection process at 724. The real-time selection process can refer to or include a real-time digital component selection process performed by a digital component selector. The one or more servers can determine whether to initiate a real-time selection process based on satisfying the criterion at 714, satisfying a different criterion, a policy, or a computing resource reduction policy.

For example, the one or more servers can determine whether to initiate a real-time selection process based on satisfying the criterion at 714. If the criterion is satisfied at 714, then the one or more servers can proceed with initiate the real-time selection process at 728.

The one or more servers can determine whether to initiate the real-time selection process based on satisfying a different criterion. The different criterion can refer to or include a different threshold with which the aggregate privacy score is compared. For example, the one or more servers may require satisfaction of a higher threshold in order to initiate the real-time selection process as compared to the threshold used to generate the response at 722. Using a higher threshold can reduce excess resource consumption and can result in more reliable, relevant, or higher performing digital components.

The one or more servers can use a policy, such as a computing resource reduction policy, to determine whether to initiate real-time selection. The policy can refer to or include comparison of the aggregate score with a threshold or criterion, or other policy. For example, the one or more servers can determine whether to initiate real-time selection based on the type of data sources. If one of the types of data sources are "email" or "cloud storage", then the policy may indicate to block real-time data selection. If the types of data sources are calendar and location, then the policy may allow real-time content selection.

The computing resource reduction policy can take additional factors into account, such as a type of client device that is requesting the information, available interfaces, remaining battery power, or type of network. For example, if the first client device is low on battery power (e.g., less than 20%) and uses a small, handheld display to provide the digital component, then the one or more servers can determine to block the real-time content selection process. If the first client device is stand-alone speaker that does not include a display and is connected to a power outlet, then the computing resource reduction policy may allow for real-time content selection and provision of a selected digital component.

If the one or more servers determines to not initiate real-time selection at 724, the one or more servers can proceed to block execution of the real-time selection process at 726. If, however, the one or more servers determines to proceed with the real-time digital component selection at 724, then the one or more servers can proceed to execute the real-time digital component selection process and provide the digital component at 728.

The one or more servers can provide the selected digital component along with the response generated at 722. The one or more servers can combine the selected digital component with the generated response to provide a single data object that includes both the response and selected digital component, thereby reducing a number of transmissions to the first client device. The one or more servers can assemble the response with the selected digital component. For example, if the output is an audio output, then the one or more servers can overlay the selected digital component with the response, append the selected digital component to the response, present the selected digital component before the response, or identify a location within the response to insert the selected digital component. Thus, the one or more servers can assemble an output that can include both the selected digital component and the generated response to cause the first client device to output (e.g., via audio output via a speaker or a display output) the present the combined selected digital component and the generated response.

Figure 8:
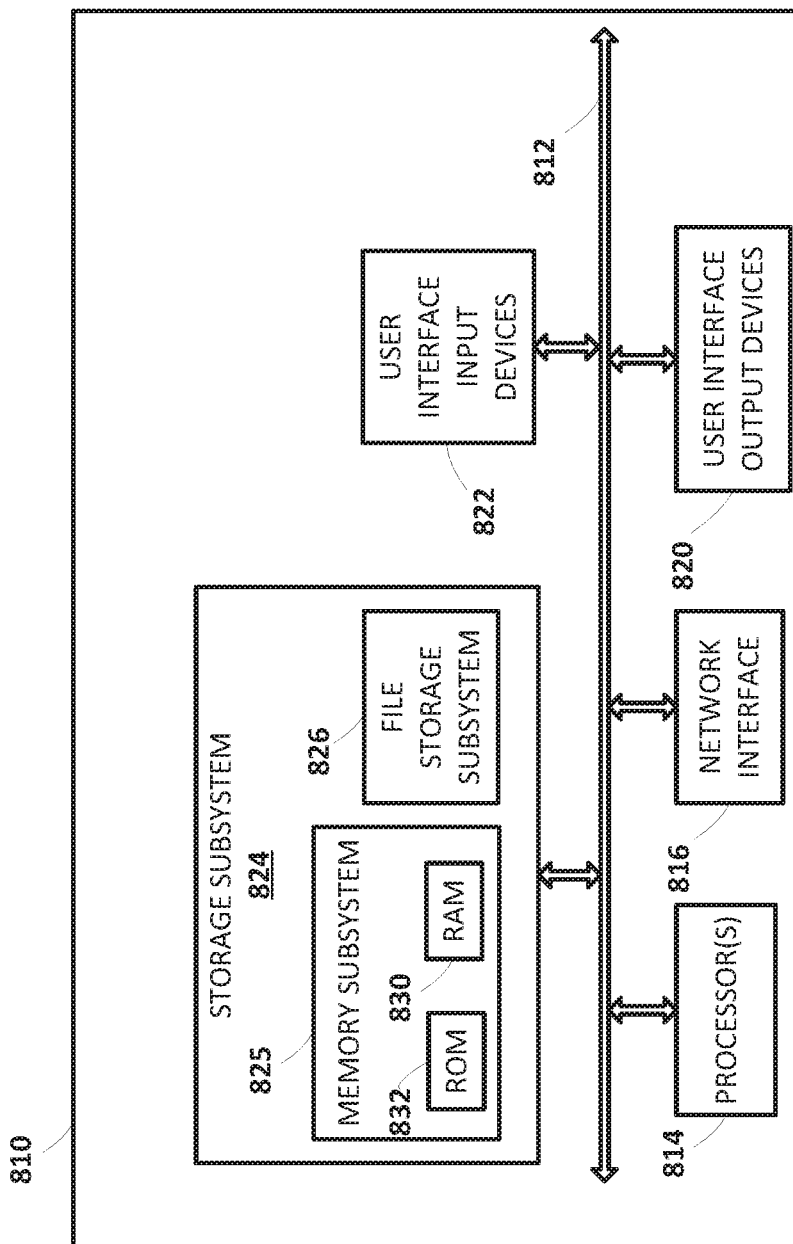
FIG. 8 illustrates an example architecture of a computing device.

FIG. 8 is a block diagram of an example computing device 810 that may optionally be utilized to perform one or more aspects of techniques described herein. In some implementations, one or more of a client computing device, user-controlled resources engine 134, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 6, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system to assemble responses from automated assistants, comprising:
one or more server computing devices that implement a server portion of one or more automated assistants;
a first automated assistant of the one or more automated assistants to:
receive a text segment via a client device associated with a first electronic account;
identify a second automated assistant corresponding to a second electronic account; and
transmit, to the second automated assistant, a request for information;
the second automated assistant of the one or more automated assistants to:
receive the request for information from the first automated assistant;
identify, from a plurality of data sources associated with the second electronic account, a first data source and a second data source different from the first data source based on the request for information;
determine a first privacy score associated with the first data source and a second privacy score associated with the second data source, the second privacy score different from the first privacy score;

determine, based on at least one of the first privacy score and the second privacy score, an aggregate privacy score associated with generation of a response to the request for information from the first automated assistant;

identify a threshold set for the first automated assistant;

determine the aggregate privacy score satisfies the threshold set for the first automated assistant; and provide, to the first automated assistant responsive to the aggregate privacy score satisfying the threshold set for the first automated assistant, data from the first data source and the second data source; and the first automated assistant to generate, based on data from at least one of the first data source and the second data source, a natural language response to be output at least in part as audio output in response to the determination that the aggregate privacy score satisfies the threshold.

2. The system of claim 1, comprising:
the one or more server computing devices comprising a digital component selector to implement a digital component selection process responsive to the aggregate privacy score satisfying the threshold.

3. The system of claim 1, comprising:
the one or more server computing devices comprising a digital component selector to block a digital component selection process based on the threshold.

4. The system of claim 1, wherein the threshold satisfied by the aggregate privacy score is a first threshold, comprising:
the one or more server computing devices comprising a digital component selector to implement a digital component selection process responsive to a digital selection threshold.

5. The system of claim 4, wherein the digital selection threshold is greater than the first threshold.

6. The system of claim 1, comprising:
the one or more server computing devices comprising a digital component selector to implement a digital component selection process responsive to an indication of a content request included in the request for information.

7. The system of claim 1, comprising:
the one or more server computing devices comprising a digital component selector to execute a real-time component selection process based on a condition that includes a time interval.

8. The system of claim 1, comprising:
the one or more server computing devices comprising a digital component selector to supplement the audio output with a supplemental digital component.

9. The system of claim 1, comprising:
the one or more server computing devices comprising a digital component selector to execute a real-time component selection process without a content request.

10. The system of claim 1, comprising the one or more server computing devices to:
receive audio captured by the client device; and
convert the audio to the text segment.

11. The system of claim 1, comprising:
the one or more server computing devices to provide the natural language response to the client device to cause the client device to present the audio output comprising the natural language response.

12. The system of claim 1, comprising:
the one or more server computing devices to select, based on the request for information, the first data source comprising one of a calendar database, a location service, or a corpus of communications associated with the second electronic account.

13. The system of claim 1, comprising:
the one or more server computing devices comprising a digital component selector to provide, for presentation via the client device, a digital component selected via a real-time digital component selection process.

14. The system of claim 1, comprising:
the one or more server computing devices comprising a digital component selector to determine, based on a policy, to initiate a real-time digital component selection process based on the aggregate privacy score.

15. A method of assembling responses from automated assistants, comprising:
receiving, by a first automated assistant executed by one or more server computing devices, a text segment via a client device associated with a first electronic account;

identifying, by the first automated assistant, a second automated assistant corresponding to a second electronic account; and transmitting, by the first automated assistant to the second automated assistant, a request for the information;

receiving, by the second automated assistant, the request for information from the first automated assistant;

identifying, by the second automated assistant, from a plurality of data sources associated with the second electronic account, a first data source and a second data source different from the first data source based on the request for information;

determining, by the second automated assistant, a first privacy score associated with the first data source and a second privacy score associated with the second data source, the second privacy score different from the first privacy score;

determining, by the second automated assistant, based on the first privacy score and the second privacy score, an aggregate privacy score associated with generation of a response to the request for information from the first automated assistant;

identifying, by the second automated assistant, a threshold set for the first automated assistant;

determining, by the second automated assistant, the aggregate privacy score satisfies the threshold set for the first automated assistant;

providing, by the second automated assistant to the first automated assistant responsive to the aggregate privacy score satisfying the threshold set for the first automated assistant, data from the first data source and the second data source; and generating, by the first automated assistant based on data from the first data source and the second data source, a natural language response to be output at least in part as audio output in response to the determination that the aggregate privacy score satisfies the threshold.

16. The method of claim 15, comprising:
initiating a digital component selection process responsive to the aggregate privacy score satisfying the threshold.

17. The method of claim 15, comprising:
initiating a digital component selection process responsive to an indication of a content request included in the request for information.

18. The method of claim 15, comprising:
initiating a real-time component selection process based on a condition that includes a time interval.

19. The method of claim 15, comprising:
supplementing the audio output with a supplemental digital component.

20. The method of claim 15, comprising:
initiating a real-time component selection process without a content request.

\* \* \* \* \*